US011679763B2

(12) United States Patent
Nagasawa

(10) Patent No.: US 11,679,763 B2
(45) Date of Patent: Jun. 20, 2023

(54) VEHICLE ACCIDENT SURROUNDING INFORMATION LINK APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 151 days.

(21) Appl. No.: 17/376,926

(22) Filed: Jul. 15, 2021

(65) Prior Publication Data

US 2022/0063609 A1   Mar. 3, 2022

(30) Foreign Application Priority Data

Aug. 31, 2020   (JP) .............................. JP2020-145300

(51) Int. Cl.
| | |
|---|---|
| *G06V 20/56* | (2022.01) |
| *B60W 30/095* | (2012.01) |
| *G08G 1/00* | (2006.01) |
| *G08G 1/16* | (2006.01) |

(52) U.S. Cl.
CPC ........... *B60W 30/095* (2013.01); *G06V 20/56* (2022.01); *G08G 1/162* (2013.01); *G08G 1/202* (2013.01); *B60W 2420/42* (2013.01)

(58) Field of Classification Search
CPC ............ B60W 30/095; B60W 2420/42; G06V 20/56; G08G 1/162; G08G 1/202
See application file for complete search history.

(56) References Cited

FOREIGN PATENT DOCUMENTS

JP   2001-216588 A   8/2001

*Primary Examiner* — Mathew Franklin Gordon
(74) *Attorney, Agent, or Firm* — McDermott Will & Emery LLP

(57) ABSTRACT

A vehicle accident surrounding information link apparatus is to be provided in an emergency report system in which emergency information about an accident is transmitted, to a server apparatus, from a vehicle involved in the accident. The vehicle accident surrounding information link apparatus includes an acquirer, a determiner, and a generator. The acquirer is configured to acquire accident surrounding information transmitted from a peripheral terminal that is different the vehicle. The determiner is configured to determine whether the acquired accident surrounding information is information about the accident of the vehicle. In a case the determiner determines the acquired accident surrounding information is information about the accident of the vehicle, the generator is configured to generate link information that associates the accident surrounding information with the emergency information transmitted from the vehicle to the server apparatus.

8 Claims, 11 Drawing Sheets

FIG. 12A  NORTH LATITUDE N2, EAST LONGITUDE E2, TIME T2, ...
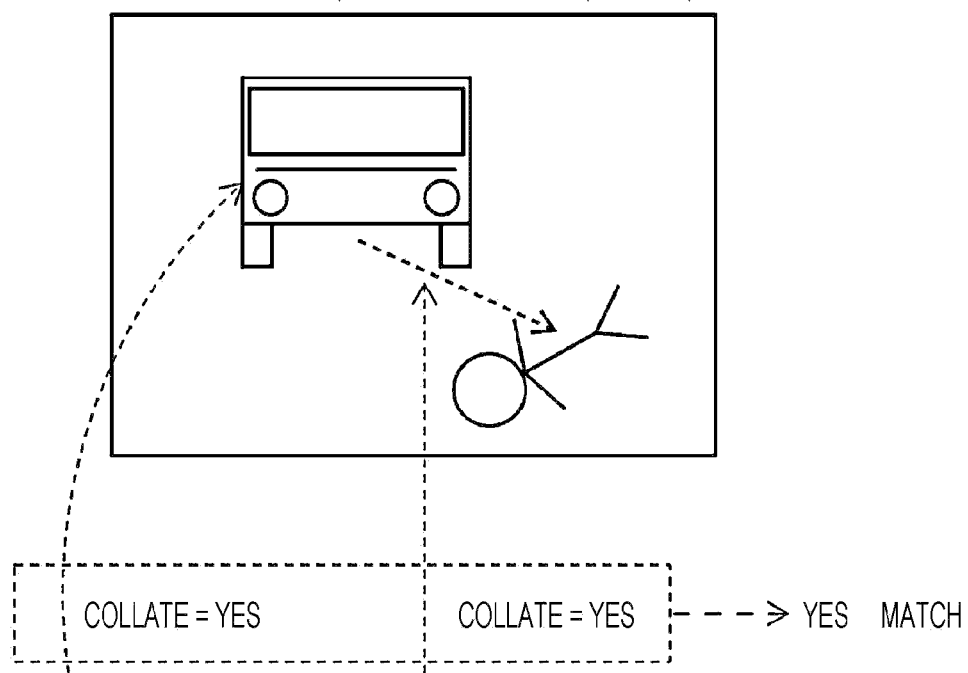
FIG. 12B
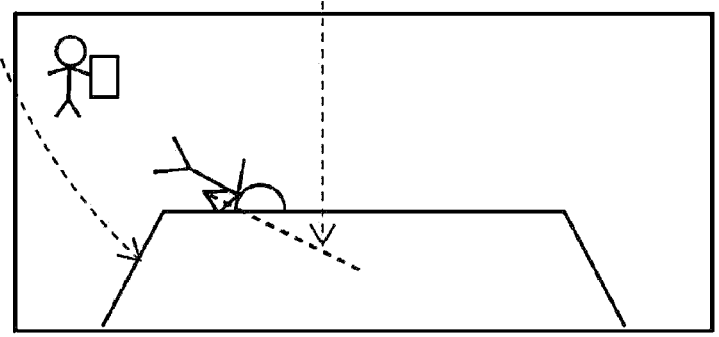

VEHICLE ACCIDENT SURROUNDING INFORMATION LINK APPARATUS

CROSS-REFERENCE TO RELATED APPLICATIONS

The present application claims priority from Japanese Patent Application No. 2020-145300 filed on Aug. 31, 2020, the entire contents of which are hereby incorporated by reference.

BACKGROUND

The disclosure relates to a vehicle accident surrounding information link apparatus.

If an accident occurs for a vehicle such as an automobile, accident information may be reported. For example, an emergency report system called an advanced automatic collision notification (AACN) system is used for automobiles. With the AACN system, an automobile involved in an accident transmits the accident information to a server apparatus at a call center by using an automatic report apparatus provided in the automobile (Japanese Unexamined Patent Application Publication No. 2001-216588). The accident information includes an operation state and the location of an occupant protection apparatus at the time of the accident and the input direction and strength of impact in the accident. At the call center, the server apparatus receives the accident information from one or more automobiles, and the accident information is checked to request the dispatch of a rescue team with an air ambulance or ambulance. This can shorten a lead time before the air ambulance or ambulance is dispatched. Thus, an occupant or occupants of the vehicle or vehicles involved in the accident are more likely to be saved.

SUMMARY

An aspect of the disclosure provides a vehicle accident surrounding information link apparatus to be provided in an emergency report system in which emergency information about an accident is transmitted, to a server apparatus, from a vehicle involved in the accident. The vehicle accident surrounding information link apparatus includes an acquirer, a determiner, and a generator. The acquirer is configured to acquire accident surrounding information transmitted from a peripheral terminal that is different from the vehicle. The determiner is configured to determine whether the acquired accident surrounding information is information about the accident of the vehicle. In a case the determiner determines the acquired accident surrounding information is information about the accident of the vehicle, the generator is configured to generate link information that associates the accident surrounding information with the emergency information transmitted from the vehicle to the server apparatus.

An aspect of the disclosure provides a vehicle accident surrounding information link apparatus to be provided in an emergency report system in which emergency information about an accident is transmitted, to a server apparatus, from a vehicle involved in the accident. The vehicle accident surrounding information link apparatus includes circuitry. The circuitry is configured to acquire accident surrounding information transmitted from a peripheral terminal that is different from the vehicle. The circuitry is configured to determine whether the acquired accident surrounding information is information about the accident of the vehicle. In a case the acquired accident surrounding information is determined to be information about the accident of the vehicle, the circuitry is configured to generate link information that associates the accident surrounding information with the emergency information transmitted from the vehicle to the server apparatus.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIGS. 12A and 12B are each an explanatory diagram of the collation determination for an image as the accident surrounding information from the peripheral terminal, performed by the automobile in FIG. 11.

DETAILED DESCRIPTION

Even if accident information about a vehicle involved in the accident is transmitted from the vehicle to the server apparatus, information about the accident may be insufficient in the server apparatus, and there is a possibility that the situation of the accident is not accurately grasped.

For example, in a case where a vehicle and a pedestrian or cyclist collide with each other, there is a possibility that accident information about the vehicle from the vehicle alone lacks for information about the pedestrian or the like involved in the accident.

In addition, for example, in a case where an accident involving a plurality of vehicles and a plurality of pedestrians occurs, there is a possibility that the correspondence relationship between the pedestrians involved in the accident and the vehicles having collided with the pedestrians, for example, is not grasped.

If it is not possible to accurately grasp the situation of the accident because of the absence of information about the pedestrian or the like involved in the accident, a rescue team that is dispatched in response to the request from the call center may be unable to provide a sufficient emergency treatment on the victims of the accident.

It is desirable to be able to grasp the situation of the accident with higher accuracy in an emergency report system.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
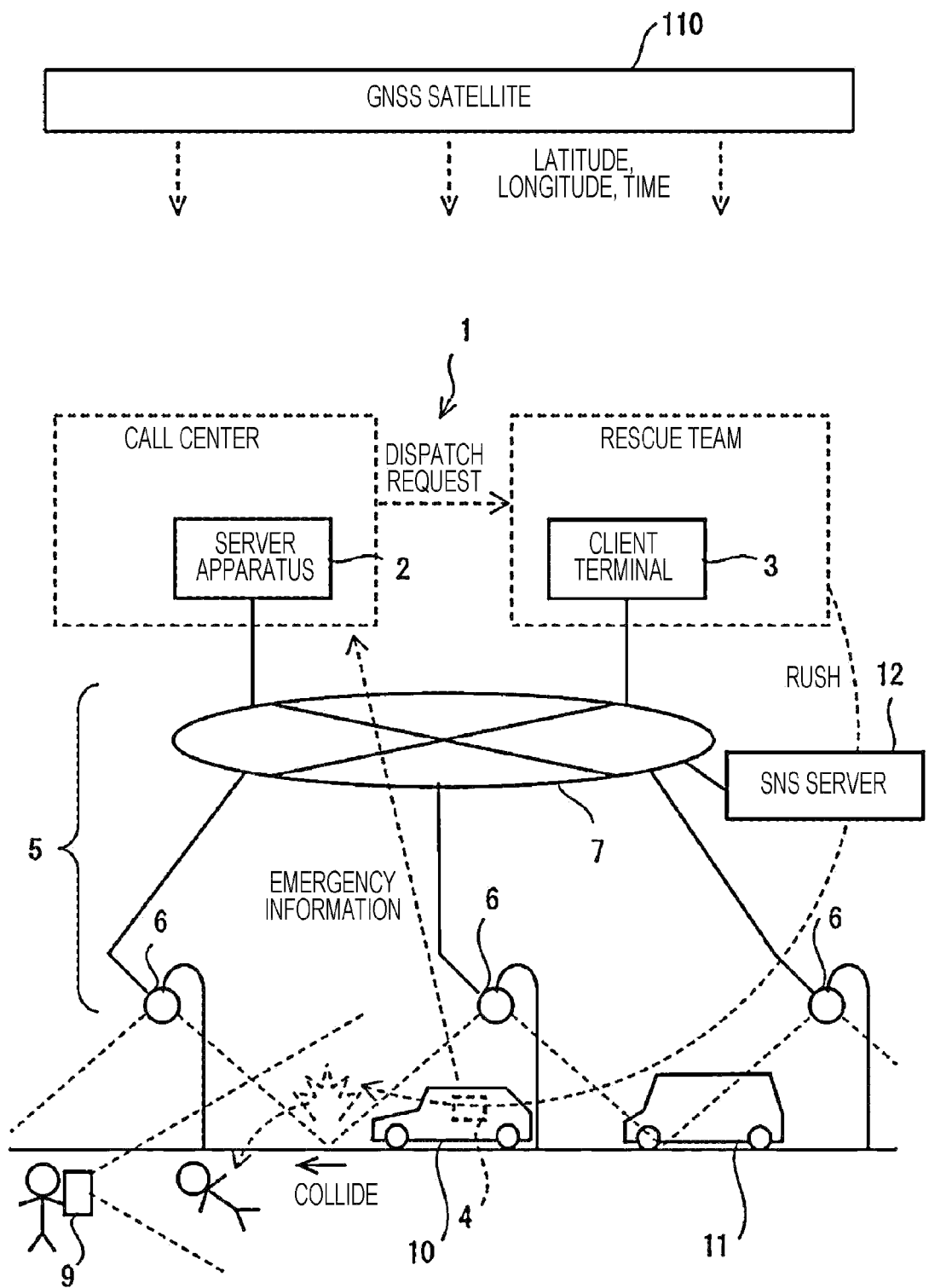
FIG. 1 is an explanatory diagram illustrating an example of an emergency report system according to a first embodiment of the disclosure.

FIG. 1 is an explanatory diagram illustrating an example of an emergency report system 1 according to a first embodiment of the disclosure.

The emergency report system 1 in FIG. 1 includes a server apparatus 2, a client terminal 3, an automatic report apparatus 4, and a wireless communication network 5. The server apparatus 2 is used at a call center of an organization that manages accidents on roads caused by automobiles 10 and the like. The client terminal 3 is used by a rescue team such as firefighters. The automatic report apparatus 4 is provided in each of the plurality of automobiles 10. The wireless communication network 5 provides a communication line to the server apparatus 2, the client terminal 3, and the automatic report apparatus 4. The wireless communication network 5 includes a plurality of base stations 6 and a communication network 7. The base stations 6 are provided in an area in a dispersed manner along roads, for example, to communicate with a wireless terminal such as the automatic report apparatus 4. The communication network 7 connects the base stations 6. Each of the base stations 6 functions as an access point to which a plurality of wireless terminals in a communicable zone are connected. To the communication network 7 in FIG. 1, the server apparatus 2 at the call center and the client terminal 3 of the rescue team are connected. An example of the emergency report system 1 used when such an accident occurs is an advanced automatic collision notification (AACN) system. In the AACN system, automatic accident information is immediately transmitted from an automobile 10 that is involved in the accident to the server apparatus 2 at the call center, and, in response to a dispatch request from the call center, a rescue team is dispatched in an ambulance 11 or an air ambulance. The call center can select and request the rescue team corresponding to the situation of the accident. The ambulance 11 or air ambulance may be dispatched for the accident site with the situation of the accident grasped. This can immediately provide victims of the accident with an appropriate lifesaving treatment in a short lead time.

Note that FIG. 1 illustrates an example of the emergency report system 1 used by a plurality of organizations in cooperation. However, the emergency report system 1 may also be used by an organization alone that manages an area including roads on which the automobile 10 and the like can pass. Examples of the organization include the police, a fire department, a government office, a hospital, a medical institution, a security company, and a management company.

FIG. 1 illustrates a global navigation satellite system (GNSS) satellite 110. Each of the plurality of apparatuses in FIG. 1 may receive radio waves including location information such as latitude and longitude and time information of a plurality of GNSS satellites 110 so as to obtain the location and time of the corresponding apparatus. Furthermore, since the plurality of GNSS satellites 110 cooperate with each other, each of the plurality of apparatuses receiving radio waves therefrom may obtain the current time, current location, and other information of the corresponding apparatus with high accuracy. The plurality of apparatuses can use a common synchronized time.

Figure 2:
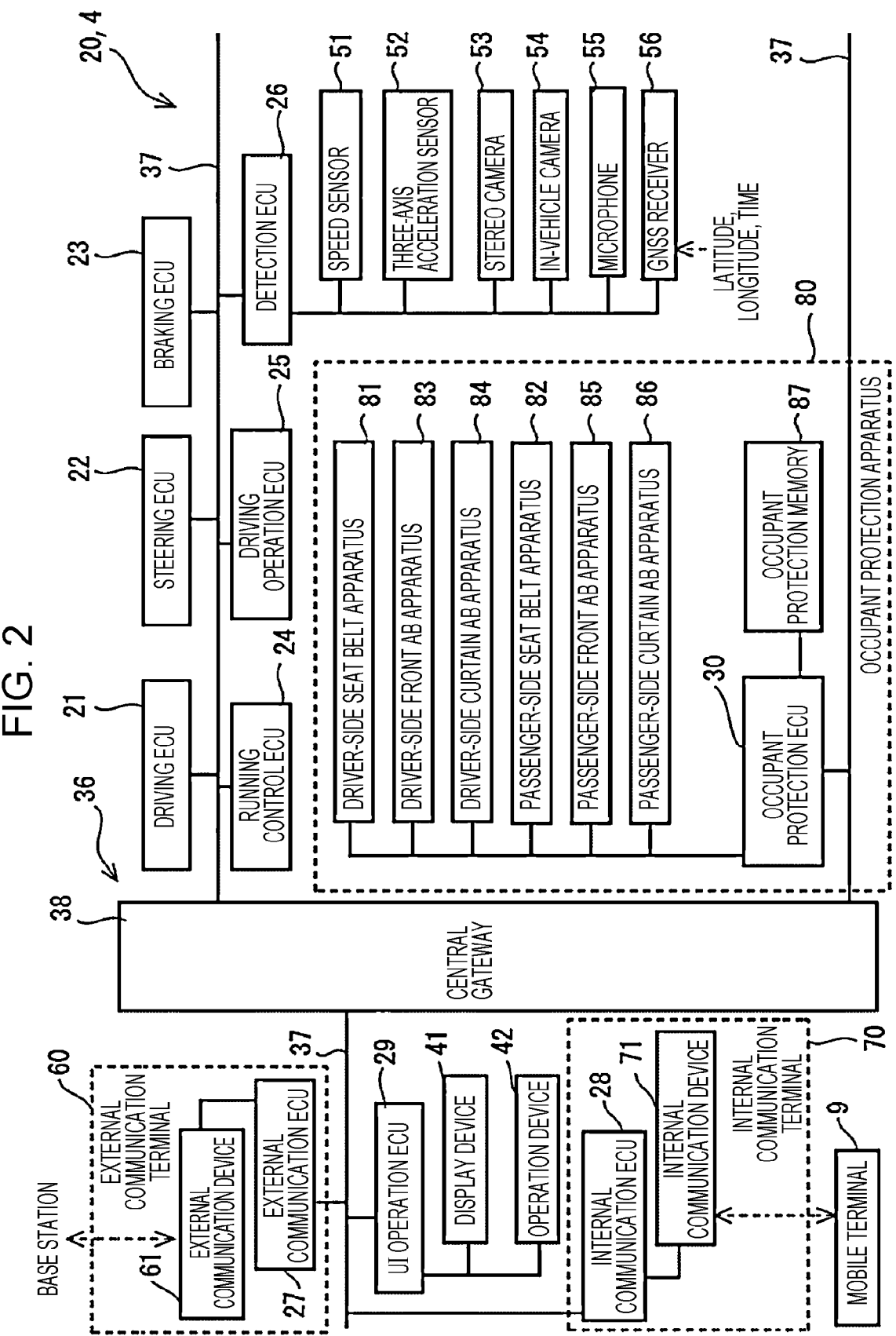
FIG. 2 is an explanatory diagram of a control system of an automobile, the control system being capable of serving as an automatic report apparatus that transmits emergency information from the automobile involved in an accident in FIG. 1.

FIG. 2 is an explanatory diagram of a control system 20 of the automobile 10. The control system 20 can serve as the automatic report apparatus 4 that transmits emergency information from the automobile 10 involved in the accident in FIG. 1.

In the control system 20 of the automobile 10 in FIG. 2, as a representative of each of a plurality of control apparatuses, an electronic control unit (ECU) that is incorporated in a corresponding one of the control apparatuses is illustrated. In addition to the control ECU, the control apparatus may include, for example, a memory for recording a control program and data, an input/output port coupled to a control object or an apparatus that detects the state thereof, a timer for measuring time, and an internal bus to which the control ECU, the memory, the input/output port, and the timer are coupled.

In one example, the control ECUs illustrated in FIG. 2 are a driving ECU 21, a steering ECU 22, a braking ECU 23, a running control ECU 24, a driving operation ECU 25, a detection ECU 26, an external communication ECU 27, an internal communication ECU 28, a user interface (UI) operation ECU 29, and an occupant protection ECU 30. The control system 20 of the automobile 10 may include another control ECU (not illustrated).

The plurality of control ECUs are coupled to a vehicle network 36 such as a controller area network (CAN) or a local interconnect network (LIN) employed in the automobile 10. The vehicle network 36 may include a plurality of bus cables 37 and a central gateway (CGW) 38. The plurality of control ECUs may be coupled via the bus cables 37, and the central gateway 38 serves as a relay apparatus to which the plurality of bus cables 37 are coupled. IDs as identification information different from each other are allocated to the plurality of control ECUs. Basically, a control ECU periodically outputs data to another control ECU. The data includes the ID of a control ECU from which the data is output and the ID of a control ECU to which the data is output. The other control ECU monitors the bus cables 37, and, if, for example, the ID of the other control ECU is added to data, the other control ECU acquires the data and executes processing based on the data. The central gateway 38 monitors each of the plurality of bus cables 37 that are coupled thereto. Upon detection of data that is output from a control ECU coupled to a certain bus cable 37 to a control ECU coupled to another bus cable 37, the central gateway 38 outputs the data to the other bus cable 37. With such relay processing performed by the central gateway 38, data may be input and output between the plurality of control ECUs even if the control ECUs are coupled to different bus cables 37.

To the UI operation ECU 29, for example, a display device 41 and an operation device 42 are coupled as user interface devices for an occupant in the vehicle. The display device 41 may be, for example, a liquid crystal device or a video projection device. The operation device 42 may be, for example, a touch panel, a keyboard, or a contactless operation detection device. The display device 41 and the operation device 42 may be installed, for example, on an inner surface of a cabin where an occupant boards. The UI operation ECU 29 acquires data from the vehicle network 36 and displays the data on the display device 41. The UI operation ECU 29 outputs an operation input on the operation device 42 to the vehicle network 36. The UI operation ECU 29 may execute processing based on the operation input and may add the processing results to the data. For example, the UI operation ECU 29 may display a navigation screen for setting a destination or the like on the display device 41, may search for a route to the destination selected by the operation input, and may add the route data to the data. The route data may include attribute information such as lanes of roads used for traveling from the current location to the destination.

To the driving operation ECU 25, for example, a steering wheel, a brake pedal, an accelerator pedal, a shift lever, and the like, which are not illustrated, are coupled as operation members for an occupant to control running of the automobile 10. In response to an operation on an operation member, the driving operation ECU 25 outputs data including the presence or absence of an operation, an operation amount, and the like to the vehicle network 36. The driving operation ECU 25 may execute processing based on the operation on the operation member and may add the processing results to the data. For example, in a situation where another moving object or a fixed object is present in the traveling direction of the automobile 10, in response to an operation on the accelerator pedal, the driving operation ECU 25 may determine the abnormal operation and may add the determination results to the data.

To the detection ECU 26, as detection members for detecting the running state of the automobile 10, for example, a speed sensor 51, a three-axis acceleration sensor 52, a stereo camera 53, an in-vehicle camera 54, a microphone 55, a GNSS receiver 56, and the like are coupled. The speed sensor 51 detects the speed of the automobile 10. The three-axis acceleration sensor 52 detects the acceleration of the automobile 10. The stereo camera 53 captures images of the surroundings of the automobile 10. The in-vehicle camera 54 captures images of an occupant in the cabin. The microphone 55 converts sound inside and outside the vehicle into data. The GNSS receiver 56 locates the automobile 10. The GNSS receiver 56 receives radio waves from the plurality of GNSS satellites 110 and obtains the latitude and longitude that are the current location of the automobile 10 and the current time. The detection ECU 26 acquires detection information from the detection members and outputs data including the detection information to the vehicle network 36. The detection ECU 26 may further execute processing based on the detection information and may add the processing results to the data. For example, if the three-axis acceleration sensor 52 detects an acceleration exceeding a collision detection threshold, the detection ECU 26 may determine that a collision is detected and may add the collision detection results to the data. On the basis of an image captured by the stereo camera 53, the detection ECU 26 may extract an object that is present around the automobile 10, such as a pedestrian, another automobile, a street tree, a utility pole, or a guardrail. The detection ECU 26 may also determine the type or attribute of the object, and, in accordance with the position, size, and change of the object in the image, may estimate the relative direction, relative distance, and moving direction (if the object is moving) of the object. The detection ECU 26 may also add forecast information on a collision with another object including such estimation results to the data and may output the forecast information to the vehicle network 36.

To the external communication ECU 27, an external communication device 61 is coupled. The external communication ECU 27 and the external communication device 61 form an external communication terminal 60 as a communication apparatus provided for the automobile 10. The external communication device 61 wirelessly communicates with a base station 6 that is near the automobile 10 in the wireless communication network 5. The external communication ECU 27 transmits and receives data to and from the server apparatus 2 or the like via the wireless communication network 5 by wireless communication between the external communication device 61 and the base station 6. The external communication terminal 60 is a transmission apparatus provided for the automobile 10 and is a type of wireless terminal.

To the internal communication ECU 28, an internal communication device 71 is coupled. The internal communication ECU 28 and the internal communication device 71 form an internal communication terminal 70 as another communication apparatus provided for the automobile 10. The internal communication device 71 performs, for example, near-field communication with a mobile terminal 9 of the occupant in the automobile 10. The mobile terminal 9 wirelessly communicates with a base station 6 that is nearby in the wireless communication network 5. FIG. 1 illustrates a mobile terminal 9 carried by a pedestrian. The internal communication ECU 28 transmits and receives data to and from the mobile terminal 9 of the occupant in the automobile 10 by near-field communication between the internal communication device 71 and the mobile terminal 9 of the occupant. Note that the mobile terminal 9 may basically be any terminal that can wirelessly communicate with a base station 6 that is nearby in the wireless communication network 5.

Note that the communication between the internal communication terminal 70 and the mobile terminal 9 of the occupant of the automobile 10 may be wireless communication conforming to the standard IEEE 802.15.1, for example. By the standard IEEE 802.15.1, for example, the internal communication terminal 70 and the mobile terminal 9 search for communication apparatuses that are nearby and capable of communication. Once authentication information matches, the internal communication terminal 70 and the mobile terminal 9 can be connected to each other. The internal communication terminal 70 and the mobile terminal 9 are directly connected and paired without using a base station 6. The authentication information is registered in a memory (not illustrated) of each of the internal communication terminal 70 and the mobile terminal 9. In the future, the internal communication ECU 28 automatically authenticates the mobile terminal 9 by using the authentication information registered in advance and establishes communication between the internal communication terminal 70 and the mobile terminal 9. Thus, by an occupant boarding the automobile 10, the mobile terminal 9 used by the occupant or the like is automatically connected to the internal communication terminal 70 and becomes communicable with the internal communication terminal 70.

The running control ECU 24 controls running of the automobile 10. For example, the running control ECU 24 acquires data from the external communication ECU 27, the detection ECU 26, the driving operation ECU 25, and the like via the vehicle network 36 and autonomously drives the automobile 10 or controls manual driving assistance for running of the automobile 10. The running control ECU 24 generates running control data for controlling running of the automobile 10 on the basis of acquired data and outputs the running control data to the driving ECU 21, the steering ECU 22, and the braking ECU 23. The driving ECU 21, the steering ECU 22, and the braking ECU 23 control running of the automobile 10 on the basis of the input running control data.

To the occupant protection ECU 30, a plurality of seat belt apparatuses, a plurality of airbag apparatuses, and an occupant protection memory 87 are coupled. The seat belt apparatuses include, for example, a driver-side seat belt apparatus 81 for an occupant who drives the automobile 10 and a passenger-side seat belt apparatus 82 for an occupant who boards the same automobile 10. The airbag apparatuses include, for example, a driver-side front airbag apparatus 83 that is deployed in front of the occupant who drives the automobile 10, a driver-side curtain airbag apparatus 84 that is deployed beside the occupant who drives the automobile 10, a passenger-side front airbag apparatus 85 that is deployed in front of the occupant who boards the same automobile 10, and a passenger-side curtain airbag apparatus 86 that is deployed beside the occupant who boards the automobile 10. The occupant protection ECU 30, the occupant protection memory 87, the driver-side seat belt apparatus 81, the passenger-side seat belt apparatus 82, the driver-side front airbag apparatus 83, the driver-side curtain airbag apparatus 84, the passenger-side front airbag apparatus 85, and the passenger-side curtain airbag apparatus 86 form an occupant protection apparatus 80.

On the basis of forecast information on a collision with another object from the detection ECU 26 or information on collision detection results, the occupant protection ECU 30 activates or controls the seat belt apparatuses or the airbag apparatuses.

The occupant protection memory 87 is a computer-readable recording medium and has a program to be executed by the occupant protection ECU 30, set values, and the like recorded thereon. Information on details of control performed by the occupant protection ECU 30 may be recorded on the occupant protection memory 87. The occupant protection ECU 30 reads the program from the occupant protection memory 87 and executes the program. Thus, the occupant protection ECU 30 may serve as an occupant protection controller of the automobile 10.

The occupant protection ECU 30 as the occupant protection controller of the automobile 10 executes occupant protection control upon detection of a collision, for example, and also collects and transmits emergency information of the automobile 10. The occupant protection ECU 30 immediately transmits the collected accident emergency information and the like to the server apparatus 2 via the base station 6 and the communication network 7 by using the external communication terminal 60.

Figure 3:
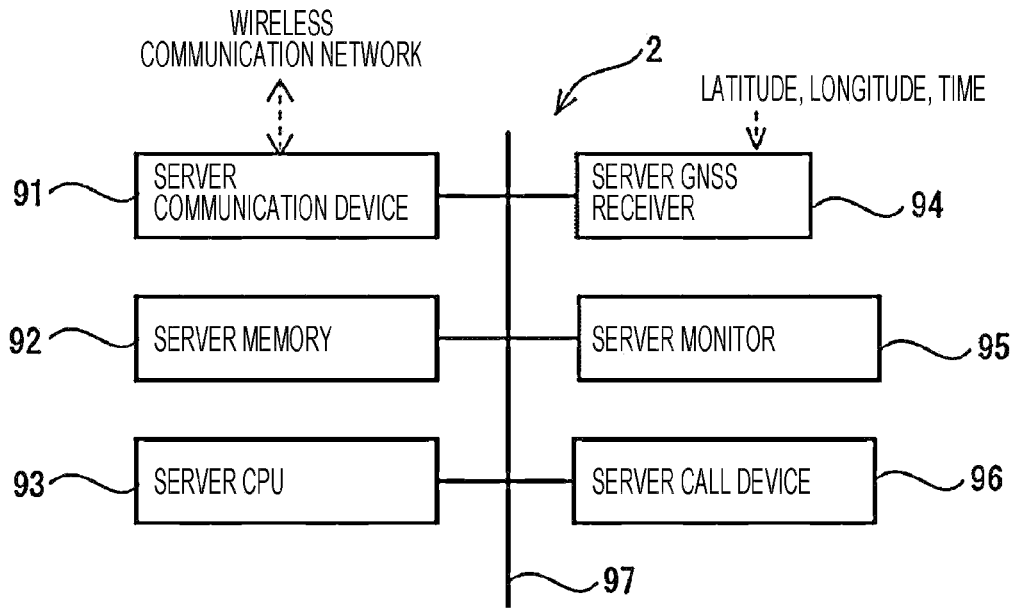
FIG. 3 is an explanatory diagram of a server apparatus used at a call center in FIG. 1.

FIG. 3 is an explanatory diagram of the server apparatus 2 used at the call center in FIG. 1.

The server apparatus 2 in FIG. 3 includes a server communication device 91, a server memory 92, a server CPU 93, a server GNSS receiver 94, a server monitor 95, a server call device 96, and a server bus 97 to which the server communication device 91, the server memory 92, the server CPU 93, the server GNSS receiver 94, the server monitor 95, and the server call device 96 are coupled.

The server communication device 91 is coupled to the communication network 7 of the wireless communication network 5. The server communication device 91 transmits and receives data to and from other apparatuses, for example, the external communication terminal 60 as a wireless terminal of the automobile 10 and the client terminal 3, via the wireless communication network 5.

The server GNSS receiver 94 receives radio waves from the GNSS satellites 110 to obtain the current time. The server apparatus 2 may include a server timer (not illustrated) to be calibrated by using the current time obtained by the server GNSS receiver 94.

The server monitor 95 displays information of the server apparatus 2. For example, the server monitor 95 displays emergency information received by the server apparatus 2 from the automobile 10 involved in an accident or the like.

The server call device 96 is used by a staff member at the call center to talk with a user of the mobile terminal 9 connected by using the server communication device 91.

The server memory 92 is a computer-readable recording medium and has a program to be executed by the server CPU 93, set values, and the like recorded thereon. Information on details of control by the server CPU 93 may be recorded on the server memory 92. The server CPU 93 reads the program from the server memory 92 and executes the program. Thus, a server controller is implemented in the server apparatus 2. The server CPU 93 as the server controller manages an overall operation of the server apparatus 2.

For example, upon the server communication device 91 receiving the emergency information immediately transmitted from each automobile 10 involved in an accident, the server CPU 93 of the server apparatus 2 at the call center causes the server monitor 95 to display the received emergency information. On the basis of the displayed emergency information from each automobile 10, a staff member at the call center judges the situation of the accident and inputs a dispatch request in accordance with the situation. The server CPU 93 transmits the dispatch request to the client terminal 3 by using the server communication device 91.

Figure 4:
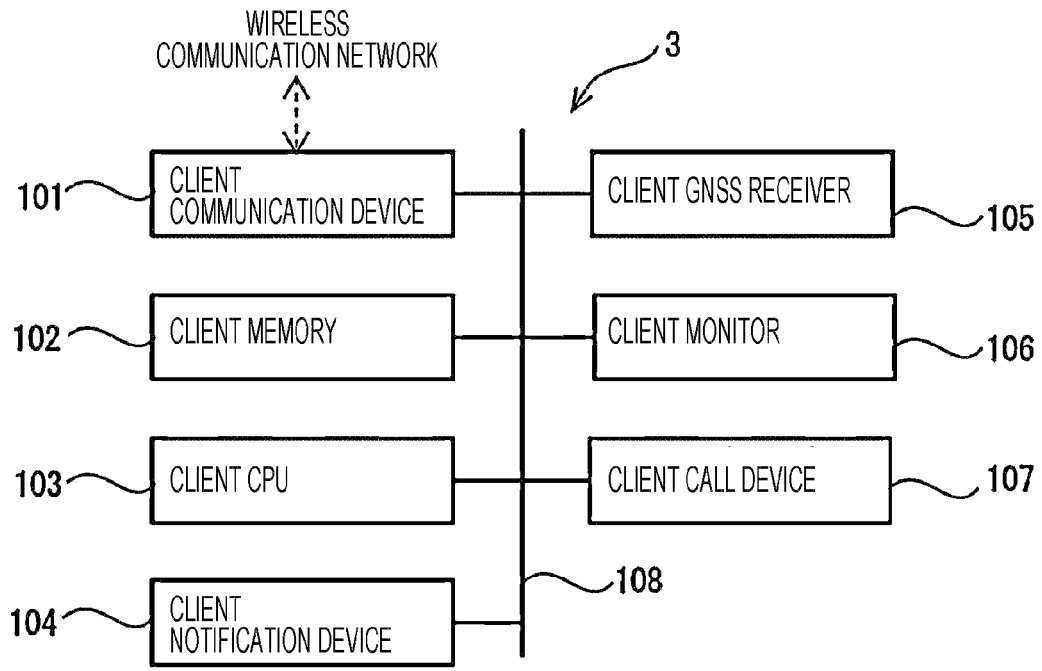
FIG. 4 is an explanatory diagram of a client terminal used by a rescue team in FIG. 1.

FIG. 4 is an explanatory diagram of the client terminal 3 used by the rescue team in FIG. 1.

The client terminal 3 in FIG. 4 includes a client communication device 101, a client memory 102, a client CPU 103, a client notification device 104, a client GNSS receiver 105, a client monitor 106, a client call device 107, and a client bus 108 to which the client communication device 101, the client memory 102, the client CPU 103, the client notification device 104, the client GNSS receiver 105, the client monitor 106, and the client call device 107 are coupled.

The client communication device 101 is coupled to the communication network 7 of the wireless communication network 5. The client communication device 101 transmits and receives data to and from other apparatuses, for example, the external communication device 61 as a wireless terminal of the automobile 10 and the server apparatus 2, via the wireless communication network 5.

The client GNSS receiver 105 receives radio waves from the GNSS satellites 110 to obtain the current time. The client terminal 3 may include a client timer (not illustrated) to be calibrated by using the current time obtained by the client GNSS receiver 105.

The client monitor 106 displays information of the client terminal 3. For example, the client monitor 106 displays a dispatch request received from the server apparatus 2.

The client notification device 104 outputs a dispatch request sound to members of the rescue team.

The client call device 107 is used by a member of the rescue team to talk with a user of the mobile terminal 9 connected by using the client communication device 101.

The client memory 102 is a computer-readable recording medium and has a program to be executed by the client CPU 103, set values, and the like recorded thereon. Information on details of control by the client CPU 103 may be recorded on the client memory 102. The client CPU 103 reads the program from the client memory 102 and executes the program. Thus, a client controller is implemented in the client terminal 3. The client CPU 103 as the client controller manages an overall operation of the client terminal 3.

For example, upon the client communication device 101 receiving the dispatch request, the client CPU 103 of the client terminal 3 of the rescue team causes the client notification device 104 to notify the rescue team of the dispatch request. In this way, in response to the dispatch request, the rescue team can rush to the accident site with the ambulance 11 or the air ambulance. The rescue team can be dispatched for the accident site with the situation of the accident grasped for each automobile 10. The rescue team can immediately provide a victim of the accident with an appropriate lifesaving treatment in a short lead time.

Figure 5:
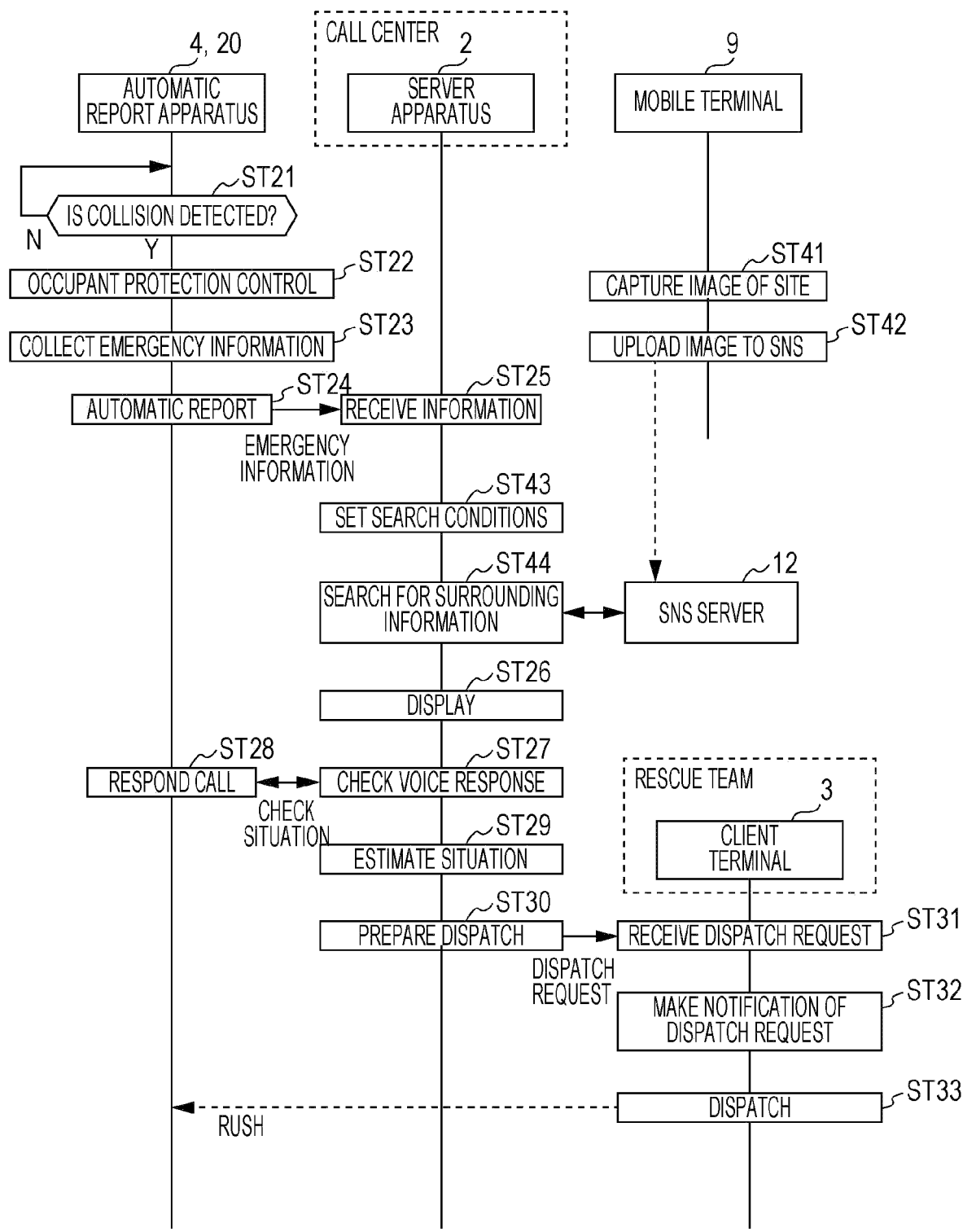
FIG. 5 is a sequence chart illustrating an example of a flow of processing in the emergency report system in FIG. 1 from an emergency report from the automobile involved in the accident to dispatch of the rescue team.

FIG. 5 is a sequence chart illustrating an example of a flow of processing in the emergency report system 1 in FIG. 1 from an emergency report from an automobile 10 involved in an accident to dispatch of a rescue team.

FIG. 5 illustrates the control system 20 as the automatic report apparatus 4 of the automobile 10, the server apparatus 2 at the call center, the client terminal 3 of the rescue team, the mobile terminal 9 of a pedestrian who is not involved in the accident, and a social networking service (SNS) server 12. Time flows from top to bottom.

In step ST21, the detection ECU 26 in the control system 20 of the automobile 10 detects a collision of the automobile 10. The detection ECU 26 detects a collision if, for example, the acceleration detected by the three-axis acceleration sensor 52 is greater than a predetermined threshold. If no collision is detected, the detection ECU 26 repeats the processing in step ST21. Upon the collision being detected, the detection ECU 26 transmits collision detection information to the occupant protection ECU 30 and advances the processing to step ST22. Note that the detection ECU 26 may end the processing if no collision is detected after a certain period of time elapsed from the start of the processing.

The detection ECU 26 may forecast that a collision is unavoidable before detecting the collision. In addition, on the basis of the forecast that the collision is unavoidable, the occupant protection ECU 30 may execute preliminary processing for occupant protection before detecting the collision. As the preliminary processing, the occupant protection ECU 30 may, for example, wind up surplus of a seat belt of a seat belt apparatus to set a pre-tension state or execute other processing. For example, the occupant protection ECU 30 may pre-deploy an airbag apparatus.

In step ST22, the occupant protection ECU 30 of the automobile 10 that has detected the collision executes occupant protection control on the basis of the information indicating that the detection ECU 26 detects the collision. The occupant protection ECU 30 selects a seat belt apparatus and an airbag apparatus to be activated. The occupant protection ECU 30 may select a seat belt apparatus for the seat in which an occupant is seated and an airbag apparatus that is deployed in the direction in which the upper body of the occupant falls due to the collision. The occupant protection ECU 30 winds up surplus of the seat belt of the selected seat belt apparatus to set a pre-tension state. On the basis of the input direction and strength of the detected collision, the occupant protection ECU 30 selects the airbag apparatus that can be deployed in the direction in which the upper body of the occupant falls due to the collision.

In this embodiment, the occupant protection ECU 30 executes the occupant protection control after the collision has been detected in step ST21. However, the occupant protection ECU 30 may alternatively execute the occupant protection control at the stage of forecast of the collision before detection of the collision.

In step ST23, the occupant protection ECU 30 of the automobile 10 that has performed the occupant protection control collects accident emergency information. The accident emergency information may basically be information collected by the AACN system described above. The AACN system collects the emergency information such as an operation state and the location of the occupant protection apparatus 80 at the time of the accident and the input direction and strength of impact in the accident.

In step ST24, the occupant protection ECU 30 of the automobile 10 executes automatic report.

In step ST25, the server communication device 91 of the server apparatus 2 at the call center receives information of the automatic report from the automobile 10 involved in the accident. The information of the automatic report received by the server communication device 91 may be recorded on the server memory 92. Before or after step ST25, the server communication device 91 of the server apparatus 2 at the call center may receive the information of the automatic report from another automobile involved in the same accident.

In step ST26, the server CPU 93 of the server apparatus 2 at the call center causes the server monitor 95 to display the emergency information of the automatic report received by the server communication device 91. On the basis of the accident emergency information displayed on the server monitor 95, a staff member at the call center can check the situation of the accident of the automobile 10.

In step ST27, the server CPU 93 of the server apparatus 2 at the call center communicates with the external communication ECU 27 of the automobile 10 involved in the accident. In step ST28, the occupant protection ECU 30 of the automobile 10 responds a voice call. Thus, a call line through which a call is possible is established between the server call device 96 and, for example, the microphone 55 of the automobile 10. The staff member at the call center checks the safety and health state of the occupant from the voice. This makes it possible to directly check the state such as the degree of injury of the occupant in the automobile 10 involved in the accident. The staff member at the call center may input the check results to the server apparatus 2.

In step ST29, the server CPU 93 of the server apparatus 2 at the call center estimates the situation. The server CPU 93 may estimate the situation on the basis of the information of the automatic report received by the server communication device 91, accident collation determination results, and the information input by the staff member at the call center. The server CPU 93 may collate with emergency information of past accidents and may estimate the situation by artificial intelligence processing. The staff member at the call center may alternatively estimate the situation by comprehensively considering the situation and may input the estimation results to the server apparatus 2.

In step ST30, the server CPU 93 of the server apparatus 2 at the call center prepares the dispatch. The server CPU 93 transmits a dispatch request to the client terminal 3 of the rescue team by using the server communication device 91. The server CPU 93 may transmit the dispatch request on the basis of an operation performed by the staff member at the call center.

In step ST31, the client communication device 101 of the client terminal 3 of the rescue team receives the dispatch request from the server apparatus 2. The dispatch request received by the client communication device 101 may be recorded on the client memory 102.

In step ST32, the client CPU 103 of the client terminal 3 of the rescue team makes a notification of the dispatch request. In response to the client communication device 101 receiving the dispatch request, the client CPU 103 causes the client notification device 104 to output a dispatch request sound. The client CPU 103 may also cause the client monitor 106 to display a dispatch request screen. The dispatch request screen may display the information of the automatic report and the information input by the staff member at the call center.

In step ST33, members of the rescue team are dispatched. The members of the rescue team can grasp that the dispatch request is made for the team from the dispatch request sound and the dispatch request screen and can be dispatched with an air ambulance or the ambulance 11.

Thus, on the basis of the accident emergency information automatically reported from the automobile 10 involved in the accident, the rescue team with the air ambulance or ambulance 11 may be dispatched in a minimum lead time without delay. The rescue team with the air ambulance or ambulance 11 may be dispatched in the appropriately prepared state on the basis of the accident emergency information acquired in advance. This increases the possibility of saving victims of the accident.

The automobile 10 running on a road may also collide with a moving object other than another automobile, for example, a pedestrian, a cyclist, or the like. In this case, the automobile 10 involved in the accident can transmit the above-described accident emergency information to the server apparatus 2, but a pedestrian or the like may be unable to transmit the accident emergency information to the server apparatus 2. For example, if a pedestrian involved in the accident has clouded consciousness, it is difficult for them to operate their mobile terminal 9. As a result, information about the accident may be insufficient in the server apparatus 2, and there is a possibility that the situation of the accident is not accurately grasped.

In addition, for example, if an accident involving a plurality of automobiles 10 and a plurality of pedestrians occurs, there is a possibility that the correspondence relationship between the pedestrians involved in the accident and the vehicles having collided with the pedestrians, for example, is not grasped The degree of injury of pedestrians and the like vary greatly depending on the way of collision with the automobiles 10. The automobiles 10 involved in the accident can add, to the emergency information, information by which the degree of injury of pedestrians or cyclists having collided can be estimated, such as the position, direction, and degree of the impact input, and a video of the pedestrians or cyclists having collided. However, unless the plurality of pedestrians and the automobiles 10 that have collided with the pedestrians can be associated with each other, it may be difficult or time-consuming to identify a pedestrian corresponding to the emergency information when used. For example, in the case where an accident involving a plurality of automobiles 10 and a plurality of pedestrians occurs in the daytime in fine weather, if an image captured by an automobile 10 is included in the emergency information, it is possible to relatively easily determine the emergency information of the automobile 10 and the pedestrian having actually collided with the automobile 10 on the basis of the size, gender, features of clothes, and the like of the pedestrian. On the other hand, at night in rainy weather, it is not always possible to clearly capture all features of the pedestrian in the image captured by the automobile 10. It may be difficult to identify the pedestrian having collided with the automobile 10 that transmits the emergency information.

As a result, the rescue team that has been dispatched in response to the request from the call center may be unable to provide a sufficient emergency treatment for the victims of the accident.

Thus, it is desirable to provide the emergency report system 1 by which the situation of the accident can be grasped with higher accuracy.

Thus, in step ST25, the server apparatus 2 in the emergency report system 1 in FIG. 5 receives the information of the automatic report from the automobile 10 involved in the accident. Subsequently, in step ST43, the server apparatus 2 extracts search conditions from the received information and sets the search conditions. In step ST44, the server apparatus 2 searches for surrounding information on the web under the set conditions. For example, as illustrated in the emergency report system 1 in FIG. 1, another pedestrian near the accident site operates their mobile terminal 9 to capture an image of the accident site in step ST41 and uploads the image to an SNS in step ST42. The mobile terminal 9 transmits data of the captured image to the SNS server 12 connected to the communication network 7 through the base station 6 and the communication network 7 in the wireless communication network 5. The data of the captured image of the accident site is registered in the SNS server 12 for a cloud service. The data of the captured image usually includes information related to image capturing, such as an imaging location and an imaging time as tag data or the like. The captured image of the accident site may probably include the automobile 10 involved in the accident as the subject and a pedestrian as another party. By acquiring the data of such a captured image of the accident site, the server apparatus 2 may provide information that is absent in the emergency information from the automobile 10 to a staff member at the call center. Details will be described below.

Figure 6:
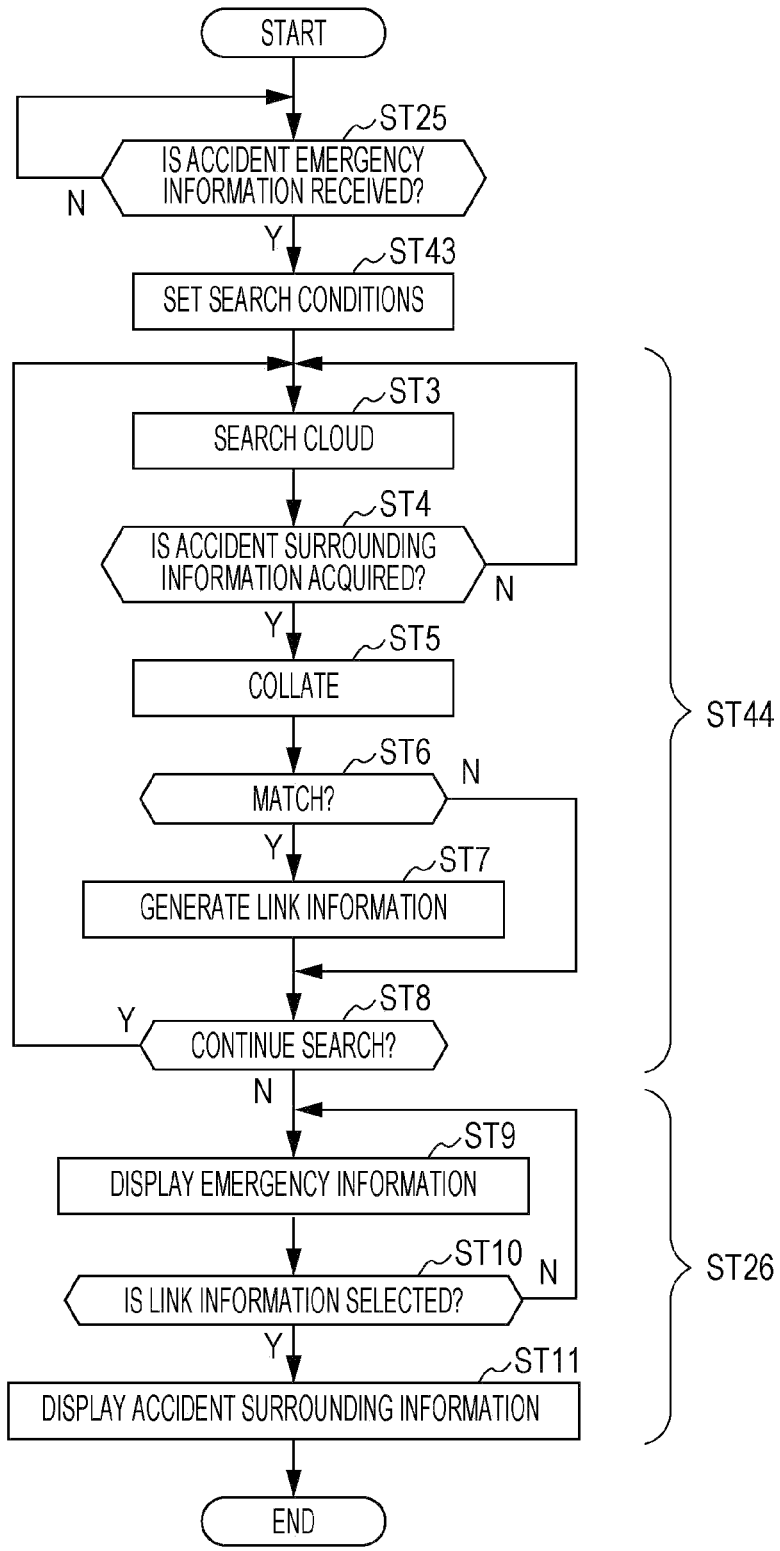
FIG. 6 is a flowchart of link processing for automobile accident surrounding information performed in the server apparatus in FIG. 1.

FIG. 6 is a flowchart of link processing for the accident surrounding information performed in the server apparatus 2 in FIG. 1. FIG. 6 corresponds to the processing from step ST25 to step ST26 in FIG. 5.

Upon a collision in the accident of the automobile 10 being detected, the automobile 10 transmits the accident emergency information to the server apparatus 2 in the emergency report system 1. Upon new emergency information being received from the automobile 10, the server CPU 93 of the server apparatus 2 executes the link processing in FIG. 6.

In step ST25, the server CPU 93 determines whether the accident emergency information is received from the automobile 10 newly involved in an accident. The accident emergency information may include, for example, AACN standard accident information such as the location of the accident site, the occurrence time of the accident, occupant protection information in the automobile 10, the input part, input direction, and strength of impact in the accident, and additional information such as the vehicle type of the automobile 10, attributes of the automobile 10 such as the color, images captured by the automobile 10 inside and outside, and a detection value of the sensor of the automobile 10. If no new accident emergency information is received, the server CPU 93 repeats the processing in step ST25. Upon the new accident emergency information being received, the server CPU 93 advances the processing to step ST43.

In step ST43, the server CPU 93 sets search conditions for searching a cloud service such as an SNS on the basis of the acquired accident emergency information. The server CPU 93 may set, as the search conditions, for example, a search area including the location of the accident site and a search time slot including the accident occurrence time.

In step ST3, the server CPU 93 starts the processing in step ST44 and searches a cloud service under the set search conditions. The accident surrounding information, such as image data obtained by capturing an image of the accident site, may be uploaded to the SNS server 12 of the cloud service from a peripheral terminal such as the mobile terminal 9 of a pedestrian around the accident site. The server CPU 93 searches for and acquires the accident surrounding information from such a peripheral terminal under the set search conditions. The peripheral terminal may be any terminal different from a peripheral terminal in the automobile 10 involved in the accident and may also be another automobile.

In step ST4, the server CPU 93 determines whether the accident surrounding information, such as image data of the accident site, is acquired. If no accident surrounding information is acquired, the server CPU 93 returns the processing to step ST3 and continues searching the cloud service. This makes it possible to acquire the accident surrounding information uploaded to the cloud service after the timing at which the server apparatus 2 receives the accident emergency information. Upon the accident surrounding information being acquired, the server CPU 93 advances the processing to step ST5.

In step ST5, the server CPU 93 collates the acquired accident surrounding information, such as image data of the accident site, with the accident emergency information from the automobile 10 acquired in step ST25. For example, the server CPU 93 extracts the image component of the automobile 10 from the image of the image data as the accident surrounding information and collates the image component with the attribute information such as the vehicle type and color of the automobile 10 involved in the accident included in the emergency information. In addition, for example, the server CPU 93 may collate the image component of the automobile 10 included in the image of the image data as the accident surrounding information with the image component of the automobile 10 involved in the accident included in the emergency information. The server CPU 93 may also collate the image component of a person such as a pedestrian included in the image of the image data as the accident surrounding information with the image component of a person such as a pedestrian in the image of the automobile 10 involved in the accident included in the emergency information. The server CPU 93 may further verify whether the accident surrounding information is information on the location of the accident site and on the occurrence time again.

In step ST6, the server CPU 93 determines whether the collated accident surrounding information matches the accident emergency information from the automobile 10 acquired in step ST25. For example, if all collation elements such as the vehicle type and color of the automobile 10 related to the above-described collation determination match, the server CPU 93 determines that the accident surrounding information matches the emergency information and advances the processing to step ST7. If any of the elements related to the collation determination does not match, the server CPU 93 determines that the accident surrounding information does not match the emergency information and advances the processing to step ST8, skipping ST7.

In step ST7, the server CPU 93 generates link information that associates the matched accident surrounding information with the accident emergency information from the automobile 10 acquired in step ST25. The link information may associate, for example, an address such as a URL of the matched accident surrounding information in the SNS server 12 with a management ID added to the emergency information. Thus, the server apparatus 2 generates the link information that can be used in the server apparatus 2. The link information is recorded on the server memory 92 in association with the accident emergency information.

In step ST8, the server CPU 93 determines whether to continue searching the cloud service. It takes time to search the cloud service. The server CPU 93 may search a plurality of cloud services. Meanwhile, the server apparatus 2 is expected to provide the emergency information and the like to a staff member at the call center as soon as possible. As long as the elapsed time from the reception of the emergency information does not exceed a predetermined threshold, the server CPU 93 determines to continue searching the cloud service and returns the processing to step ST3. Thus, the server CPU 93 searches for the next accident surrounding information. When the elapsed time from the reception of the emergency information exceeds the predetermined threshold, the server CPU 93 ends the search of the cloud service as the processing in step ST44 and advances the processing to step ST9.

In step ST9, the server CPU 93 starts the processing in step ST26 in which the emergency information is read from the server memory 92 and displayed on the server monitor 95. For example, an AACN standard screen is displayed on the server monitor 95. The AACN standard screen displays the location of the accident site, the occurrence time of the accident, occupant protection information in the automobile 10, the input part, input direction, and strength of impact in the accident. The AACN standard screen may also display a selection button for the link information obtained by cloud search.

In step ST10, the server CPU 93 determines whether the link information is selected. The server CPU 93 may determine whether the link information is selected on the basis of whether the selection button for the link information displayed together with the AACN standard screen is operated by a staff member at the call center. If the link information is not selected, the server CPU 93 returns the processing to step ST9 and continues displaying the AACN standard screen. In response to the link information being selected, the server CPU 93 advances the processing to step ST11.

In step ST11, the server CPU 93 acquires the accident surrounding information, such as image data of the accident site, from the SNS server 12 or the like on the basis of the selected link information and causes the server monitor 95 to display the accident surrounding information. Using the link information generated by the server apparatus 2, the server CPU 93 outputs the accident surrounding information in association with the emergency information transmitted from the automobile 10 involved in the accident to the server apparatus 2. In the above manner, the server CPU 93 ends the processing in step ST44.

Figure 7A:
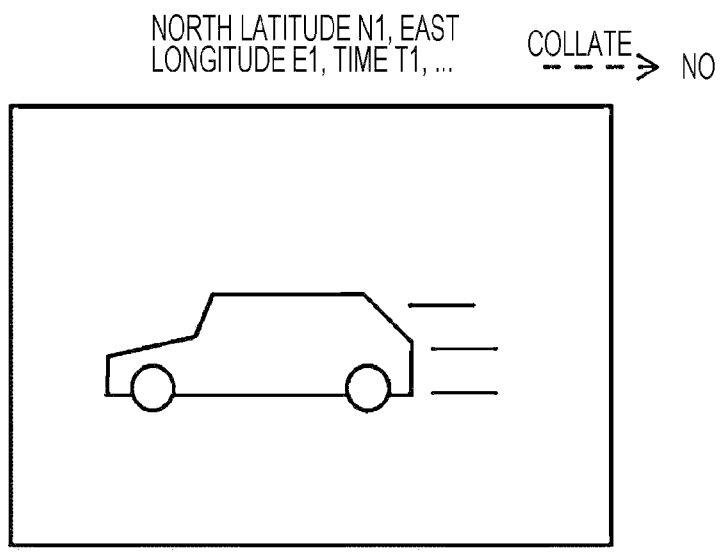
FIGS. 7A and 7B are each an explanatory diagram of collation determination for an image as the accident surrounding information from a peripheral terminal performed by the server apparatus in FIG. 6.
Figure 7B:
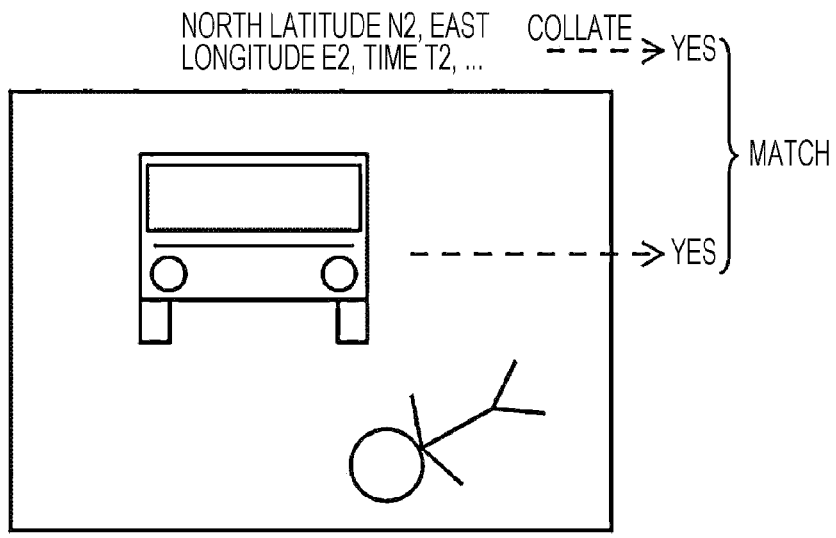

FIGS. 7A and 7B are each an explanatory diagram of the collation determination for an image as the accident surrounding information from the peripheral terminal in the link processing performed by the server apparatus 2 in FIG. 6.

FIG. 7A is an image of the running automobile 10 captured by the mobile terminal 9 at a location away from the accident site. In this case, an imaging location and an imaging time different from those of the accident site are added to the image as the accident surrounding information. Therefore, in step ST3 or step ST6, the server CPU 93 determines that the location and time of the image as the accident surrounding information do not match the location and time of the accident site included in the emergency information acquired from the automobile 10 involved in the accident.

FIG. 7B is an image of the automobile 10 and a pedestrian involved in the accident captured by the mobile terminal 9 near the accident site. In this case, substantially the same imaging location and imaging time as those of the accident site are added to the image as the accident surrounding information. Therefore, in step ST3 or step ST6, the server CPU 93 determines that the location and time of the image as the accident surrounding information match the location and time of the accident site included in the emergency information acquired from the automobile 10 involved in the accident.

In this case, from among the image in FIG. 7A and the image in FIG. 7B uploaded to the SNS server 12, the server CPU 93 determines that the image in FIG. 7B matches and generates the link information. In step ST11, from among the image in FIG. 7A and the image in FIG. 7B, the image in FIG. 7B is displayed on the server monitor 95.

As described above, in this embodiment, the server apparatus 2 in the emergency report system 1 in which accident emergency information can be transmitted from the automobile 10 involved in the accident to the server apparatus 2 is provided with an accident surrounding information link apparatus. The accident surrounding information link apparatus acquires accident surrounding information, such as a captured image of the accident site, transmitted from a peripheral terminal other than a peripheral terminal in the automobile 10 involved in the accident to a cloud service, such as the SNS server 12, collates the accident surrounding information with the emergency information from the automobile 10 involved in the accident, and determines that the accident surrounding information is information about the accident of the automobile 10. The accident surrounding information link apparatus further generates link information so that the link information can be used in the server apparatus 2. The link information associates the accident surrounding information from the peripheral terminal determined to be the information about the accident of the automobile 10 with the emergency information transmitted from the automobile 10 to the server apparatus 2. Thus, the server apparatus 2 or the like can use, on the basis of the link information, the accident surrounding information transmitted from the peripheral terminal different from a peripheral terminal in the automobile 10 involved in the accident to the cloud service, such as the SNS server 12, in addition to the accident emergency information from the automobile 10 involved in the accident. On the basis of the accident surrounding information, a staff member or the like at the call center can grasp a situation that they are unable to grasp on the basis of the emergency information alone from the automobile 10 involved in the accident. On the basis of rich information supplemented with the accident surrounding information, a staff member or the like at the call center can judge the situation at the accident site in detail and more reliably and can dispatch expected rescue team members to the site. On the basis of the rich information supplemented with the accident surrounding information, the rescue team members can also grasp not only the situation of the occupant but also the situation of the pedestrian or the like and can rush to the site in a capable state.

For example, in a case where a pedestrian or cyclist is involved in the accident of the automobile 10, it is expected that the pedestrian or bicyclist involved in the accident is grasped on the basis of the accident surrounding information associated with the link information.

In addition, for example, even in a case where an accident involving a plurality of automobiles 10 and a plurality of pedestrians has occurred, it is expected that the correspondence relationship between the pedestrians and the automobiles 10 having collided with the pedestrians is appropriately grasped on the basis of the accident surrounding information associated with the link information.

On the basis of an image at the time of the accident included in the emergency information from one of the plurality of automobiles 10, information on the direction in which a pedestrian having collided with the automobile 10 is knocked over is acquired.

For example, when the surrounding information link apparatus acquires the accident surrounding information, such as a captured image of the accident site, and collates the accident surrounding information with the emergency information from the automobile 10 involved in the accident, the surrounding information link apparatus uses, on the basis of a captured image of both the automobile 10 and the knocked over pedestrian as the accident surrounding information, the direction in which the pedestrian having collided with the automobile 10 is knocked over in the emergency information. If the accident surrounding information matches the emergency information, the surrounding information link apparatus associates the pedestrian in the accident surrounding information with the emergency information as an object that has come into contact with the single automobile 10.

Even if the accident surrounding information is an image of the knocked over pedestrian alone, as long as the information on the location of the person who has captured the image and the imaging direction can be acquired, on the basis of estimation of the location of the pedestrian and the relative positional relationship of the location of the automobile 10 included in the emergency information, the pedestrian in the accident surrounding information can be associated with the emergency information as an object that has come into contact with the single automobile 10.

As described above, even in a case where an accident involving a plurality of automobiles 10 and a plurality of pedestrians has occurred, and it is not possible to determine which pedestrian has come into contact on the basis of the emergency information alone, since the surrounding information link apparatus can associate the pedestrian with the emergency information, the emergency information can be used to rescue the pedestrian.

Figure 8:
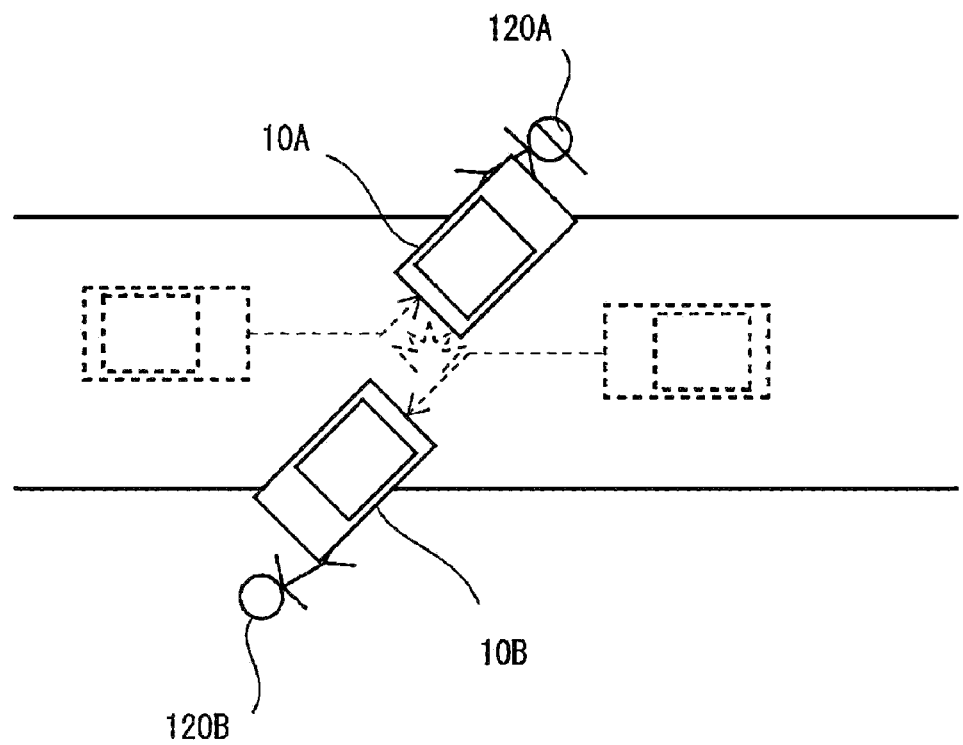
FIG. 8 is an explanatory diagram illustrating an example of a state where an accident involving a plurality of automobiles and a plurality of pedestrians has occurred.

FIG. 8 is an explanatory diagram illustrating an example of a state where an accident involving a plurality of automobiles and a plurality of pedestrians has occurred.

A first automobile 10A and a second automobile 10B have been running on a road facing each other. In FIG. 8, the first automobile 10A and the second automobile 10B have collided with each other and then moved toward left and right road shoulders to stop. The first automobile 10A has collided with a first pedestrian 120A on one road shoulder. The second automobile 10B has collided with a second pedestrian 120B on the other road shoulder.

If information about such an accident is acquired, the surrounding information link apparatus merely determines that an accident involving the plurality of automobiles 10A and 10B and the plurality of pedestrians 120A and 120B has occurred on the basis of acquired information.

The surrounding information link apparatus may further identify or attempt to identify that the first automobile 10A has collided with the first pedestrian 120A and that the second automobile 10B has collided with the second pedestrian 120B in the accident. For example, the surrounding information link apparatus may identify that the first automobile 10A and the first pedestrian 120A are involved in the accident on the basis of an image of both the first automobile 10A and the first pedestrian 120A. For example, the surrounding information link apparatus may identify that the second automobile 10B and the second pedestrian 120B are involved in the accident on the basis of an image of both the second automobile 10B and the second pedestrian 120B. If any of the above can be identified, the surrounding information link apparatus may estimate the degree of collision with the first pedestrian 120A, the degree of injury, and the like on the basis of the information on the acceleration of the first automobile 10A during the accident and may estimate the degree of collision with the second pedestrian 120B, the degree of injury, and the like on the basis of the information on the acceleration of the second automobile 10B during the accident. By such information analyzing the accident being obtained, a rescue team can rush to the accident site with equipment and scale corresponding to the situation of the accident.

Second Embodiment

Next, the emergency report system 1 according to a second embodiment of the disclosure will be described. In the following description, differences from the above-described embodiment will be mainly described. The same components as those of the above-described embodiment are denoted by the same reference numerals as those of the above-described embodiment, and description thereof is omitted.

Figure 9:
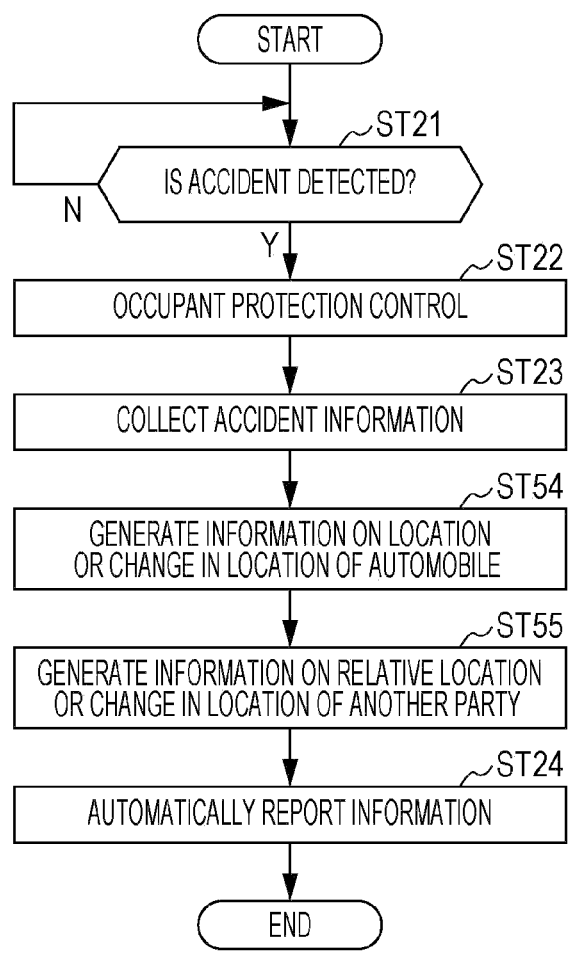
FIG. 9 is a flowchart of accident information generation processing performed in the automobile by the control system of the automobile according to a second embodiment of the disclosure.

FIG. 9 is a flowchart of accident information generation processing performed in the automobile 10 by the control system 20 of the automobile 10 according to the second embodiment of the disclosure.

Upon a collision of the automobile 10 due to an accident being detected, the control system 20 of the automobile 10 executes the accident information generation processing in FIG. 9.

In step ST21, the detection ECU 26 determines whether a collision is detected. The detection ECU 26 detects a collision if, for example, the acceleration detected by the three-axis acceleration sensor 52 is greater than a predetermined threshold. If no collision is detected, the detection ECU 26 repeats the processing in step ST21. Upon the collision being detected, the detection ECU 26 transmits collision detection information to the occupant protection ECU 30 and advances the processing to step ST22. Note that the detection ECU 26 may end the processing if no collision is detected after a certain period of time has elapsed from the start of the processing.

In step ST22, the occupant protection ECU 30 executes occupant protection control on the basis of the collision detection information from the detection ECU 26. The occupant protection ECU 30 selects a seat belt apparatus and an airbag apparatus to be activated and activates the seat belt apparatus and the airbag apparatus on the basis of the strength, direction, and input part of impact and the boarding position of an occupant. Thus, the occupant may be protected from the impact.

In this embodiment, the occupant protection control is executed after the collision has been detected in step ST21. However, the occupant protection control may alternatively be executed at the stage of the preliminary processing when the collision has been forecast before step ST21. The occupant protection control may alternatively be executed at the stage of the collision forecast before detecting the collision.

In step ST23, the occupant protection ECU 30 collects accident information. The occupant protection ECU 30 acquires, for example, data of an image of the outside of the vehicle captured by the stereo camera 53 in addition to AACN standard accident information such as the location of the automobile 10.

In step ST54, the occupant protection ECU 30 or the detection ECU 26 generates information on the location or change in the location of the automobile 10. For example, on the basis of the location of the GNSS receiver 56 or the detection value of the three-axis acceleration sensor 52, the occupant protection ECU 30 or the detection ECU 26 generates the location of the automobile 10 or a change direction and a change amount of the location of the automobile 10 in a predetermined period from before the accident to after the accident. The information on the location or change in the location of the automobile 10 may be an absolute value based on latitude and longitude or a value based on a predetermined location of the automobile 10 before the accident.

In step ST55, the occupant protection ECU 30 or the detection ECU 26 generates information on the location or change in the location of another party involved in the accident of the automobile 10. For example, on the basis of an image captured by the stereo camera 53, the occupant protection ECU 30 or the detection ECU 26 generates the location of the other party or a change direction and a change amount of the location of the other party in a predetermined period from before the accident to after the accident. The information on the location and change in the location of the other party may be based on an absolute value such as latitude and longitude determined on the basis of the image captured by the stereo camera 53 or may be a relative value based on the location or change in the location of the automobile 10.

In step ST24, the external communication ECU 27 transmits the emergency information collected or generated by the above-described processing to the server apparatus 2 in the emergency report system 1. The emergency information in this case includes the AACN standard accident information, data of the image of the outside of the vehicle captured by the stereo camera 53, the information on the location or change in the location of the automobile 10, and the information on the location or change in the location of the other party.

Upon new emergency information being received from the automobile 10, the server CPU 93 of the server apparatus 2 executes the link processing in FIG. 6 as the processing from step ST25 to step ST26 in FIG. 5.

In the collation processing in step ST5 and the matching determination in step ST6 in FIG. 6, the server CPU 93 collates the information on the location or change in the location of the automobile 10 or the other party in the accident surrounding information from the peripheral terminal with the information on the location or change in the location of the automobile 10 or the other party involved in the accident included in the emergency information to determine matching. If the information on the location or change in the location of the automobile 10 or the other party in the acquired accident surrounding information from the peripheral terminal matches the information on the location or change in the location acquired from the automobile 10 involved in the accident in a correlated manner, the server CPU 93 determines that the accident surrounding information is information about the accident of the automobile 10. If not, the server CPU 93 does not determine that the accident surrounding information is information about the accident of the automobile 10. In this case, pieces of information of automobiles 10 may be compared with each other, pieces of information of pedestrians may be compared with each other, or pieces of information of an automobile 10 and a pedestrian may be compared with each other. Even if the pieces of information of the automobile 10 and the pedestrian are compared with each other, it is considered that there is a certain correlation because the location of the pedestrian changes in the direction of the change in the location of the automobile 10.

Figure 10A:
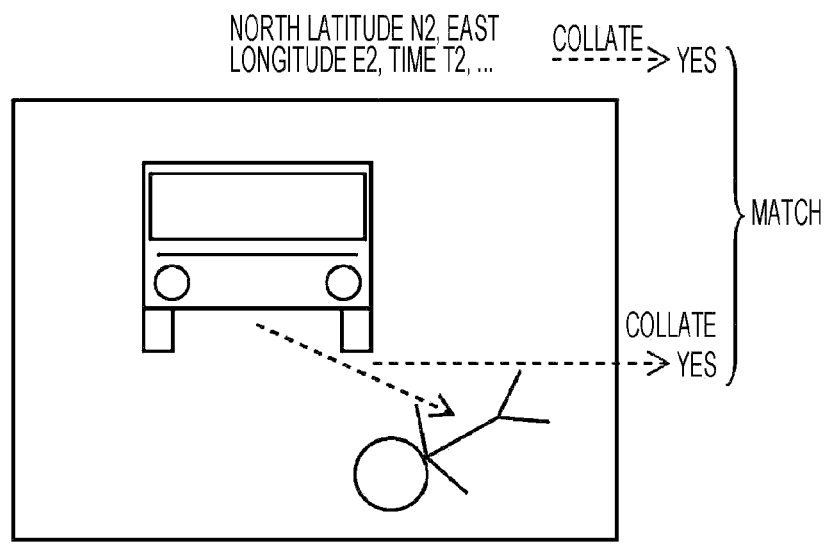
FIGS. 10A and 10B are each an explanatory diagram of the collation determination for an image as the accident surrounding information from the peripheral terminal in a case where the accident information in FIG. 9 is used in the link processing performed by the server apparatus in FIG. 6.
Figure 10B:
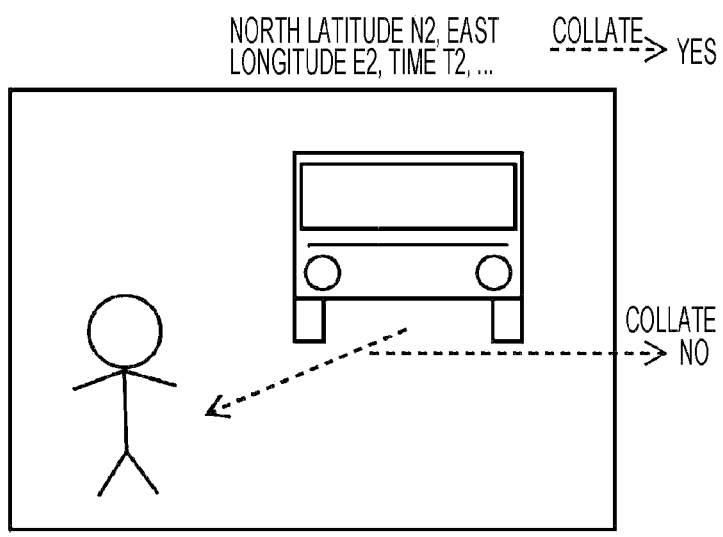

FIGS. 10A and 10B are each an explanatory diagram of the collation determination for an image as the accident surrounding information from the peripheral terminal in a case where the accident information in FIG. 9 is used in the link processing performed by the server apparatus 2 in FIG. 6.

FIG. 10A is an image of the automobile 10 and a pedestrian involved in the accident captured by the mobile terminal 9 near the accident site. In this case, substantially the same imaging location and imaging time as those of the accident site are added to the image as the accident surrounding information. Therefore, in step ST3 or step ST6, the server CPU 93 determines that the location and time of the image as the accident surrounding information match the location and time of the accident site included in the emergency information acquired from the automobile 10 involved in the accident. In the image as the accident surrounding information, the pedestrian involved in the accident falls to a position in the left forward direction with respect to the automobile 10 involved in the accident. The server CPU 93 collates the location or change in the location of the pedestrian who is the other party of the accident with reference to the automobile 10 in the image in FIG. 10A with the location or change in the location of the pedestrian who is the other party of the accident included in the emergency information acquired from the automobile 10 involved in the accident. Since these match each other in the image of FIG. 10A, the server CPU 93 determines that the image in FIG. 10A is image data as the accident surrounding information and generates the link information.

FIG. 10B is an image of the automobile 10 involved in the accident and a pedestrian not involved in the accident captured by the mobile terminal 9 near the accident site. In this case, substantially the same imaging location and imaging time as those of the accident site are added to the image as the accident surrounding information. Therefore, in step ST3 or step ST6, the server CPU 93 determines that the location and time of the image as the accident surrounding information match the location and time of the accident site included in the emergency information acquired from the automobile 10 involved in the accident. In the image as the accident surrounding information, the pedestrian not involved in the accident stands at a position in the right forward direction with respect to the automobile 10 involved in the accident. The server CPU 93 collates the location or change in the location of the pedestrian who is not the other party of the accident with reference to the automobile 10 in the image in FIG. 10B with the location or change in the location of the pedestrian who is the other party of the accident included in the emergency information acquired from the automobile 10 involved in the accident. Since these do not match each other in the image in FIG. 10B, the server CPU 93 does not determine that the image in FIG. 10B is image data of the accident surrounding information. In this case, the server CPU 93 does not generate the link information for the image in FIG. 10B.

As described above, the server CPU 93 executes determination by collating the information on the location or change in the location of the automobile 10 or the pedestrian as the other party in the image acquired from the SNS server 12 of the cloud service with the information on the location or change in the location of the automobile 10 or the other party at the accident site acquired from the automobile 10 involved in the accident. On the basis of an image of the outside of the vehicle captured in the dark by the automobile 10 that is involved in the accident and that may have a damaged headlight or the like, the server CPU 93 can perform collation determination without performing processing of obtaining the information on the location or change in the location of the automobile 10 or the pedestrian as the other party in the image. There is a possibility that the color or shape of the automobile 10 or the pedestrian is not clearly and easily extracted from the dark image.

As described above, in this embodiment, the automobile 10 generates the information on the location or change in the location of the automobile 10 or the other party before and after the accident and transmits the information to the server apparatus 2. Subsequently, on the basis of a correlation between the information on the location or change in the location of the automobile 10 or the other party in the accident surrounding information acquired by the acquirer from the peripheral terminal and the information on the location or change in the location acquired from the automobile 10 involved in the accident, the server apparatus 2 determines whether the accident surrounding information acquired by the acquirer is information about the accident of the automobile 10. Thus, the processing load on the server apparatus 2 may be reduced. The server apparatus 2 can determine with high accuracy the suitability of the acquired accident surrounding information from the peripheral terminal, on the basis of the highly accurate information on the location or change in the location collected at each accident site. This may increase the selection probability of the accident surrounding information while reducing the processing load on the server apparatus 2.

In addition, the server apparatus 2 can perform collation determination on an image as the accident surrounding information from the peripheral terminal, for example, without extracting the locations of the automobile 10 and the pedestrian from the dark image of the outside of the vehicle captured by the automobile 10 involved in the accident at night or at a dark place such as a tunnel. Since the peripheral terminal does not malfunction, an image captured by the peripheral terminal is likely to be an image of a subject brightly captured by using the flash even if the image is captured at night or at a dark place such as a tunnel. It is easy to perform the processing of extracting the locations of the automobile 10 and the pedestrian in an image in which the subject is bright.

Similarly to the above-described embodiment, the server apparatus 2 may determine that the first automobile 10A and the first pedestrian 120A have collided with each other and that the second automobile 10B and the second pedestrian 120B have collided with each other in the state where the accident involving the plurality of automobiles 10 and the plurality of pedestrians occurs as illustrated in FIG. 8.

Third Embodiment

Next, the emergency report system 1 according to a third embodiment of the disclosure will be described. In the embodiments described above, the server apparatus 2 executes the link processing for the accident surrounding information. In this embodiment, the automobile 10 executes the link processing for the accident surrounding information. In the following description, differences from the above-described embodiments will be mainly described. The same components as those of the above-described embodiments are denoted by the same reference numerals as those of the above-described embodiments, and description thereof is omitted.

Figure 11:
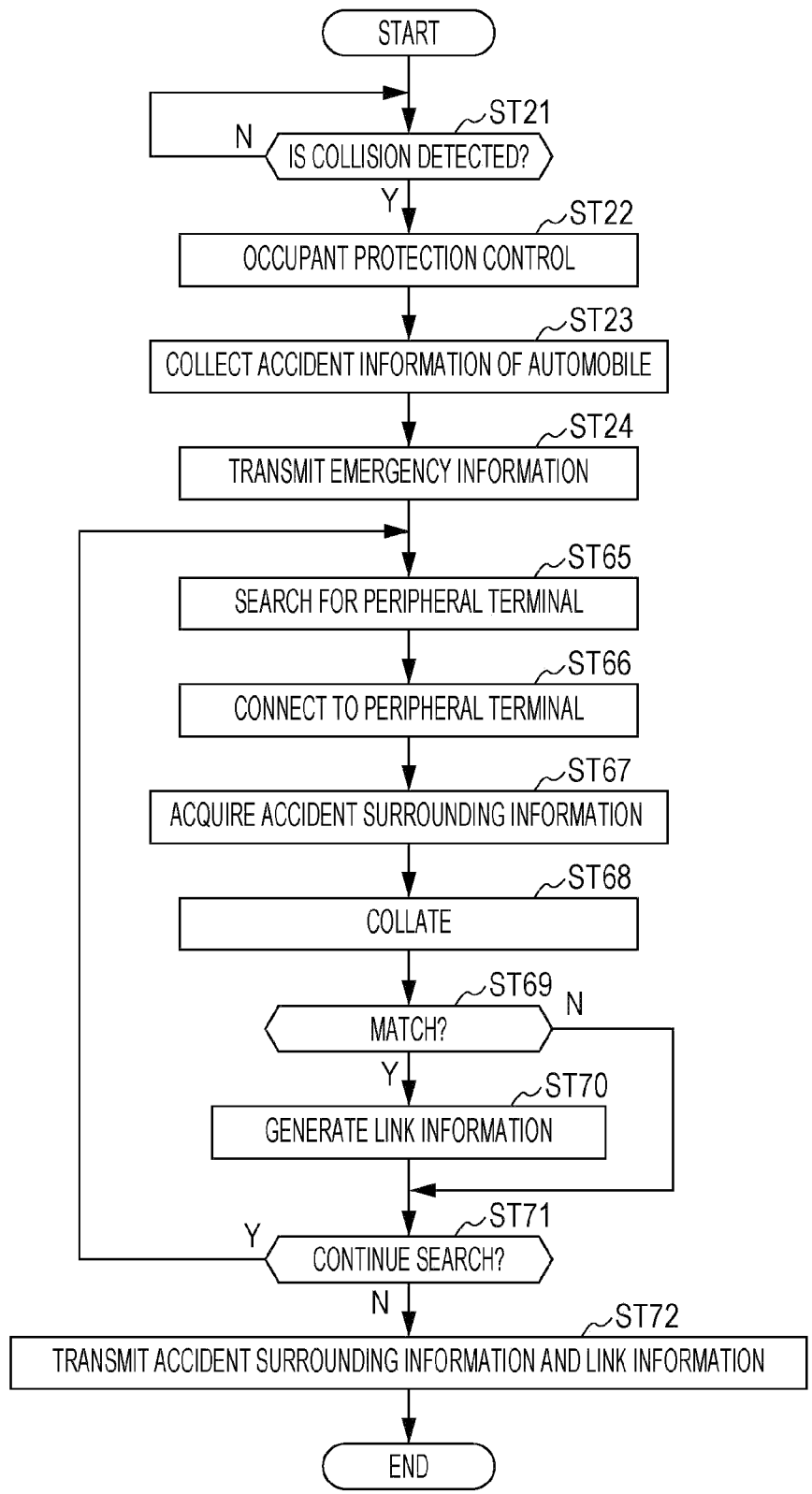
FIG. 11 is a flowchart of the link processing for the automobile accident surrounding information performed by the control system of the automobile according to a third embodiment of the disclosure.

FIG. 11 is a flowchart of the link processing for the accident surrounding information performed by the control system 20 of the automobile 10 according to the third embodiment of the disclosure.

Upon a collision of the automobile 10 due to an accident being detected, the occupant protection ECU 30 and the like in the control system 20 of the automobile 10 executes the link processing for the accident surrounding information in FIG. 11.

In step ST21, the detection ECU 26 determines whether a collision of the automobile 10 due to an accident is detected. For example, the three-axis acceleration sensor 52 can detect the acceleration of large impact that is unlikely to be detected during normal running. If the detection ECU 26 determines that no collision due to an accident is detected on the basis of the detection value of the three-axis acceleration sensor 52, the detection ECU 26 repeats the processing in step ST21. Upon the collision of the automobile 10 due to an accident being detected, the detection ECU 26 transmits collision detection information to the occupant protection ECU 30 and advances the processing to step ST22.

In step ST22, the occupant protection ECU 30 executes occupant protection control on the basis of the collision detection information. The occupant protection ECU 30 selects a seat belt apparatus and an airbag apparatus to be activated and activates the seat belt apparatus and the airbag apparatus on the basis of the strength, direction, and input part of impact and the boarding position of an occupant. Thus, the occupant may be protected from the impact.

In step ST23, the occupant protection ECU 30 collects accident information. The occupant protection ECU 30 acquires, for example, data of an image of the outside of the vehicle captured by the stereo camera 53 in addition to AACN standard accident information such as the location of the vehicle.

In step ST24, the occupant protection ECU 30 immediately transmits the emergency information generated by the above-described processing to the server apparatus 2 in the emergency report system 1.

In step ST65, the internal communication ECU 28 searches for a peripheral terminal that is present around the automobile 10. The internal communication ECU 28 searches for the mobile terminal 9 that is nearby, for example, by near-field communication using the internal communication device 71. Thus, the internal communication ECU 28 may also search for the mobile terminal 9 of a pedestrian outside the vehicle for which authentication information is not registered.

In step ST66, the internal communication ECU 28 is connected to the found peripheral terminal. For example, the internal communication ECU 28 is connected, by using the internal communication device 71, to the mobile terminal 9 of the pedestrian outside the vehicle for which authentication information is not registered. At this time, the internal communication ECU 28 may establish a connection with the found peripheral terminal after approving the peripheral terminal.

In step ST67, the internal communication ECU 28 acquires accident surrounding information from the connected peripheral terminal. If the peripheral terminal captures an image of the accident site at the site, data of the image is acquired as the accident surrounding information.

In step ST68, the occupant protection ECU 30 or the detection ECU 26 collates the acquired accident surrounding information, such as the image data of the accident site, with various pieces of information owned by the automobile 10. For example, the occupant protection ECU 30 or the detection ECU 26 extracts the image component of the automobile 10 from the image of the image data as the accident surrounding information and collates the image component with attribute information such as the vehicle type and color of the automobile 10 owned by the automobile 10. In addition, for example, the occupant protection ECU 30 or the detection ECU 26 may collate the image component of the automobile 10 included in the image of the image data as the accident surrounding information with the image component of the automobile 10 in the image outside the vehicle captured by the automobile 10. The occupant protection ECU 30 or the detection ECU 26 may also collate the image component of a person such as a pedestrian included in the image of the image data as the accident surrounding information with the image component of a person such as a pedestrian in the image outside the vehicle captured by the automobile 10. The occupant protection ECU 30 or the detection ECU 26 may verify whether the imaging location and the imaging time included in the accident surrounding information are the location and time at which the accident has occurred in the emergency information owned by the automobile 10.

In step ST69, the occupant protection ECU 30 or the detection ECU 26 determines whether the collated accident surrounding information matches various pieces of information owned by the automobile 10. For example, if all collation elements such as the vehicle type and color of the automobile 10 related to the above-described collation determination match, the occupant protection ECU 30 or the detection ECU 26 determines that the accident surrounding information matches the information of the automobile 10 and advances the processing to step ST70. If any of the elements related to the collation determination does not match, the occupant protection ECU 30 or the detection ECU 26 determines that the accident surrounding information does not match the information of the automobile 10 and advances the processing to step ST71, skipping step ST70.

In step ST70, the occupant protection ECU 30 or the detection ECU 26 generates link information that associates the matched accident surrounding information with the accident emergency information to be transmitted to the server apparatus 2. The link information may associate, for example, a file name of the matched accident surrounding information with a management ID added to the emergency information. Thus, the occupant protection ECU 30 may generate the link information that can be used in the server apparatus 2.

In step ST71, the occupant protection ECU 30 or the detection ECU 26 determines whether to continue searching for a peripheral terminal. It takes time to perform the processing of searching for peripheral terminals, sequentially connecting the peripheral terminals, and acquiring the accident surrounding information. Meanwhile, a staff member at the call center is expected to issue a dispatch request as soon as possible upon the server apparatus 2 receiving the emergency information. For example, as long as the elapsed time from the transmission of the emergency information does not exceed a predetermined threshold, the occupant protection ECU 30 or the detection ECU 26 determines to continue searching for a peripheral terminal and returns the processing to step ST65. Thus, the occupant protection ECU 30 or the detection ECU 26 searches for a peripheral terminal in order to obtain the next accident surrounding information. When the elapsed time from the transmission of the emergency information exceeds the predetermined threshold, the occupant protection ECU 30 or the detection ECU 26 ends the search for a peripheral terminal and advances the processing to step ST72.

In step ST72, the external communication ECU 27 transmits the accident surrounding information from the peripheral terminal and the link information acquired in the above-described processing to the server apparatus 2 in the emergency report system 1.

The server CPU 93 of the server apparatus 2 receives the accident surrounding information from the peripheral terminal and the link information from the automobile 10 involved in the accident while receiving the new emergency information and executing the link processing in FIG. 6. The server CPU 93 records, on the server memory 92, the accident surrounding information from the peripheral terminal and the link information received from the automobile 10 involved in the accident, as well as the emergency information.

Upon the link information being selected in step ST10 in FIG. 6, in step ST11, the server CPU 93 causes the server monitor 95 to display the screen of the accident surrounding information from the peripheral terminal received from the automobile 10 involved in the accident, by using the link information received from the automobile 10 involved in the accident.

FIGS. 12A and 12B are each an explanatory diagram of the collation determination for an image as the accident surrounding information from the peripheral terminal, performed by the automobile 10 in FIG. 11.

FIG. 12A is an image as the accident surrounding information acquired by the automobile 10 from the peripheral terminal. The peripheral terminal records the image in FIG. 12A by capturing the image of the accident site.

FIG. 12B is an image of the outside of the vehicle captured by the automobile 10 and owned by the automobile 10. The automobile 10 records the image in FIG. 12B by capturing an image of the outside of the vehicle with the stereo camera 53.

Upon the image as the accident surrounding information in FIG. 12A being acquired from the peripheral terminal, the occupant protection ECU 30 of the automobile 10 involved in the accident analyzes the image and extracts the image component of the automobile 10 and the image component of a person such as a pedestrian. The occupant protection ECU 30 collates the extracted image component of the automobile 10 with attribute information such as the vehicle type and color of the automobile 10. The occupant protection ECU 30 may perform collation with the image captured by the stereo camera 53 in FIG. 12B. However, at night without illumination, the color of the automobile 10 in the image captured by the stereo camera 53 may be incorrect. For this reason, it is desirable to collate as much as possible with attribute information such as the vehicle type and color owned by the automobile 10 as attribute information. The occupant protection ECU 30 obtains information on the location or change in the location of the pedestrian that is the other party of the collision obtained from the information of the automobile 10, such as the image captured by the stereo camera 53 or the like, or the input part of the collision and compares the information with the image component of the person such as a pedestrian. For example, on the basis of the information of the automobile 10, the occupant protection ECU 30 may obtain information on the direction of the relative position of the pedestrian that is the other party with respect to the location of the automobile 10 and may collate the information with the direction of the imaging location of the person with respect to the imaging location of the automobile 10 in the peripheral terminal. If all of these elements are collated and match, the occupant protection ECU 30 determines that the image acquired from the peripheral terminal is related to the accident of the automobile 10 and generates the link information. The occupant protection ECU 30 transmits the generated link information and the image acquired from the peripheral terminal to the server apparatus 2. In this way, by using the information owned by the automobile 10, the automobile 10 may accurately determine matching of the accident surrounding information acquired from the peripheral terminal.

As described above, in this embodiment, in the emergency report system 1 in which accident emergency information can be transmitted from the automobile 10 involved in the accident to the server apparatus 2, the control ECU such as the occupant protection ECU 30 of the automobile 10 executes acquisition processing and link processing for accident surrounding information as an accident surrounding information link apparatus. For example, the control ECU such as the occupant protection ECU 30 pairs the internal communication terminal 70 of the automobile 10 involved in the accident with a peripheral terminal at the accident site, receives and collects accident surrounding information, such as a captured image of the accident site, from the peripheral terminal, and collates the accident surrounding information with information owned by the automobile 10. Upon the information being determined to be information about the accident of the automobile 10, the control ECU such as the occupant protection ECU 30 generates link information that associates the accident surrounding information from the peripheral terminal with the emergency information so that the link information can be used in the server apparatus 2 and transmits the generated link information to the server apparatus 2 together with the acquired accident surrounding information. Thus, the server apparatus 2 can use the accident surrounding information regarding the accident from the peripheral terminal in association with the emergency information from the automobile 10 involved in the accident without executing the processing of generating the link information for the accident surrounding information. On the basis of the accident surrounding information, a staff member or the like at the call center can grasp a situation that they are unable to grasp on the basis of the emergency information alone from the automobile 10 involved in the accident. On the basis of rich information supplemented with the accident surrounding information, a staff member or the like at the call center can judge the situation at the accident site in detail and more reliably and can dispatch expected rescue team members to the site. On the basis of the rich information supplemented with the accident surrounding information, the rescue team members can also grasp not only the situation of the occupant but also the situation of the pedestrian or the like and can rush to the site in a capable state.

Similarly to the above-described embodiments, the server apparatus 2 may determine that the first automobile 10A and the first pedestrian 120A have collided with each other and that the second automobile 10B and the second pedestrian 120B have collided with each other in the state where the accident involving the plurality of automobiles 10 and the plurality of pedestrians occurs as illustrated in FIG. 8.

The above-described embodiments are examples of embodiments of the disclosure, and the disclosure is not limited thereto. Various modifications or changes may be made without departing from the gist of the disclosure.

In the embodiments described above, the plurality of ECUs are present in a separated manner in the automobile 10, but some or all of the ECUs may be integrated into one ECU.

For example, in the embodiments described above, the server apparatus 2 or the automobile 10 involved in an accident executes the link information generation processing upon detection of the accident or reception of accident emergency information based on the detection.

For example, the server apparatus 2 or the automobile 10 involved in the accident may also execute the link information generation processing upon an operation of the server apparatus 2 performed by a staff member at the call center who determines that there is a possibility that the situation of the accident is not grasped on the basis of the emergency information alone.

In the above-described embodiments, the occupant protection ECU 30 in the automobile 10 executes the link information generation processing or processing therefor.

For example, a control ECU in the automobile 10 other than the occupant protection ECU 30 may also execute the link information generation processing or processing therefor.

In the disclosure, a vehicle accident surrounding information link apparatus is to be provided in an emergency report system in which emergency information about an accident is transmitted from a vehicle involved in the accident to a server apparatus. The vehicle accident surrounding information link apparatus acquires accident surrounding information transmitted from a peripheral terminal that is different from the vehicle, collates the accident surrounding information with the emergency information and the like of the vehicle, and determines that the accident surrounding information is information about the accident of the vehicle. Subsequently, the vehicle accident surrounding information link apparatus generates link information that associates the accident surrounding information, which is determined to be the information about the accident of the vehicle, with the emergency information transmitted from the vehicle to the server apparatus.

Thus, the server apparatus or the like can use the accident surrounding information that is transmitted from an object other than the vehicle, on the basis of the link information in addition to the emergency information related to the accident from the vehicle involved in the accident. On the basis of the accident surrounding information, a staff member or the like at the call center can grasp a situation that they are unable to grasp on the basis of the emergency information alone from the vehicle involved in the accident. On the basis of rich information supplemented with the accident surrounding information, a staff member or the like at the call center can judge the situation at the accident site in detail and more reliably and can dispatch expected rescue team members to the site. On the basis of the rich information supplemented with the accident surrounding information, the rescue team members can also grasp more reliably not only the situation of the occupant but also the situation of the pedestrian or the like and can rush to the site in a capable state.

The server CPU 93 of the server apparatus 2 and the occupant protection ECU 30 and the detection ECU 26 in the control system 20 of the automobile 10 illustrated in FIGS. 3 and 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the server CPU 93 of the server apparatus 2 and the occupant protection ECU 30 and the detection ECU 26 in the control system 20 of the automobile 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 3 and 2.

The invention claimed is:

1. A vehicle accident surrounding information link apparatus to be provided in an emergency report system in which emergency information about an accident is transmitted, to a server apparatus, from a vehicle involved in the accident, the vehicle accident surrounding information link apparatus comprising:
   an acquirer configured to acquire accident surrounding information transmitted from a peripheral terminal that is different from the vehicle;
   a determiner configured to determine whether the acquired accident surrounding information is information about the accident of the vehicle; and
   a generator configured to, in a case the determiner determines the acquired accident surrounding information is information about the accident of the vehicle, generate link information that associates the accident surrounding information with the emergency information transmitted from the vehicle to the server apparatus.

2. The vehicle accident surrounding information link apparatus according to claim 1,
- wherein the determiner is configured to determine whether the acquired accident surrounding information is the information about the accident of the vehicle by collating a location, a time, or an image for the accident surrounding information acquired by the server apparatus with a location, a time, or an image for the emergency information transmitted from the vehicle to the server apparatus.

3. The vehicle accident surrounding information link apparatus according to claim 1,
- wherein the acquirer is configured to acquire the accident surrounding information received by the server apparatus, and
- wherein the vehicle accident surrounding information link apparatus further comprises:
- an outputter configured to output the accident surrounding information in association with the emergency information transmitted from the vehicle to the server apparatus, using the link information generated by the generator.

4. The vehicle accident surrounding information link apparatus according to claim 2,
- wherein the acquirer is configured to acquire the accident surrounding information received by the server apparatus, and
- wherein the vehicle accident surrounding information link apparatus further comprises:
- an outputter configured to output the accident surrounding information in association with the emergency information transmitted from the vehicle to the server apparatus, using the link information generated by the generator.

5. The vehicle accident surrounding information link apparatus according to claim 1,
- wherein the vehicle involved in the accident generates information on a location or change in the location of the vehicle or another party and transmits the information to the server apparatus, and
- wherein the determiner is configured to determine that the acquired accident surrounding information is the information about the accident of the vehicle if there is a correlation between information on a location or change in the location of the vehicle or another party in the accident surrounding information acquired by the acquirer and the information on the location or change in the location acquired from the vehicle involved in the accident.

6. The vehicle accident surrounding information link apparatus according to claim 2,
- wherein the vehicle involved in the accident generates information on a location or change in the location of the vehicle or another party and transmits the information to the server apparatus, and
- wherein the determiner is configured to determine that the acquired accident surrounding information is the information about the accident of the vehicle if there is a correlation between information on a location or change in the location of the vehicle or another party in the accident surrounding information acquired by the acquirer and the information on the location or change in the location acquired from the vehicle involved in the accident.

7. The vehicle accident surrounding information link apparatus according to claim 1,
- wherein the acquirer is configured to acquire the accident surrounding information received by the vehicle involved in the accident from the peripheral terminal,
- wherein the determiner is configured to determine whether the acquired accident surrounding information is the information about the accident by collating the acquired accident surrounding information from the peripheral terminal with information owned by the vehicle involved in the accident, and
- wherein the vehicle transmits the acquired accident surrounding information and the link information to the server apparatus.

8. A vehicle accident surrounding information link apparatus to be provided in an emergency report system in which emergency information about an accident is transmitted, to a server apparatus, from a vehicle involved in the accident, the vehicle accident surrounding information link apparatus comprising:
- circuitry configured to
  - acquire accident surrounding information transmitted from a peripheral terminal that is different from the vehicle,
  - determine whether the acquired accident surrounding information is information about the accident of the vehicle, and
  - in a case the acquired accident surrounding information is determined to be information about the accident of the vehicle, generate link information that associates the accident surrounding information with the emergency information transmitted from the vehicle to the server apparatus.

* * * * *